(12) United States Patent
Prsa et al.

(10) Patent No.: US 11,987,401 B2
(45) Date of Patent: May 21, 2024

(54) SYSTEMS AND METHODS FOR MODULAR UNMANNED VEHICLES

(71) Applicant: FLIR Unmanned Aerial Systems ULC, Vancouver (CA)

(72) Inventors: Steven Andrew Prsa, Waterloo (CA); Albert Pegg, Waterloo (CA); Dietmar Frank Wennemer, Ontario (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 661 days.

(21) Appl. No.: 17/114,469

(22) Filed: Dec. 7, 2020

(65) Prior Publication Data

US 2021/0171198 A1    Jun. 10, 2021

Related U.S. Application Data

(60) Provisional application No. 62/945,461, filed on Dec. 9, 2019.

(51) Int. Cl.
| | |
|---|---|
| *H04B 7/185* | (2006.01) |
| *B64U 20/87* | (2023.01) |
| *B64U 101/30* | (2023.01) |
| *G03B 15/00* | (2021.01) |
| *B64U 10/13* | (2023.01) |

(52) U.S. Cl.
CPC ......... *B64U 20/87* (2023.01); *H04B 7/18506* (2013.01); *B64U 10/13* (2023.01); *B64U 2101/30* (2023.01); *G03B 15/006* (2013.01)

(58) Field of Classification Search
CPC ........ B64U 20/00; B64U 20/80; B64U 20/83; B64U 20/87; B64U 10/10; B64U 10/13; B64U 10/14; B64U 10/20; B64U 2101/30; B64U 2101/31; H04B 7/18502; H04B 7/18506; G03B 15/00; G03B 15/006
USPC .......................................................... 439/34
See application file for complete search history.

(56) References Cited

U.S. PATENT DOCUMENTS

| | | | |
|---|---|---|---|
| 7,489,013 B1 | 2/2009 | Chubin et al. | |
| 7,705,439 B2 | 4/2010 | Pham et al. | |
| 7,880,248 B1 | 2/2011 | Pham et al. | |
| 8,268,668 B1 | 9/2012 | Pham et al. | |
| 10,435,143 B1 | 10/2019 | O'Brien et al. | |
| 2017/0134699 A1* | 5/2017 | Kim | H04N 7/183 |
| 2017/0163896 A1* | 6/2017 | Kang | H04N 23/60 |

(Continued)

FOREIGN PATENT DOCUMENTS

| | | |
|---|---|---|
| CN | 107531322 A | 1/2018 |
| CN | 108698695 A | 10/2018 |
| CN | 110383812 A | 10/2019 |

(Continued)

*Primary Examiner* — Khiem M Nguyen
(74) *Attorney, Agent, or Firm* — Haynes and Boone, LLP

(57) ABSTRACT

An unmanned vehicle (UV) is provided. The UV comprises an aircraft component, an interposer component electrically and mechanically coupled to the aircraft component, and a payload component electrically and mechanically coupled to the interposer component. The interposer component comprising a processor and a memory storing instructions which when executed by the processor configured the processor to receive a communication from one of the aircraft component or the payload component, and sent the communication to the other of the aircraft component or the payload component.

20 Claims, 19 Drawing Sheets

(56) References Cited

U.S. PATENT DOCUMENTS

2018/0170553 A1* 6/2018 Wang ................... B64D 13/006
2018/0319490 A1* 11/2018 Baek ....................... B64C 27/48

FOREIGN PATENT DOCUMENTS

| JP | 2017171291 A | 9/2017 |
|----|--------------|--------|
| WO | WO 2019204931 A1 | 10/2019 |

* cited by examiner

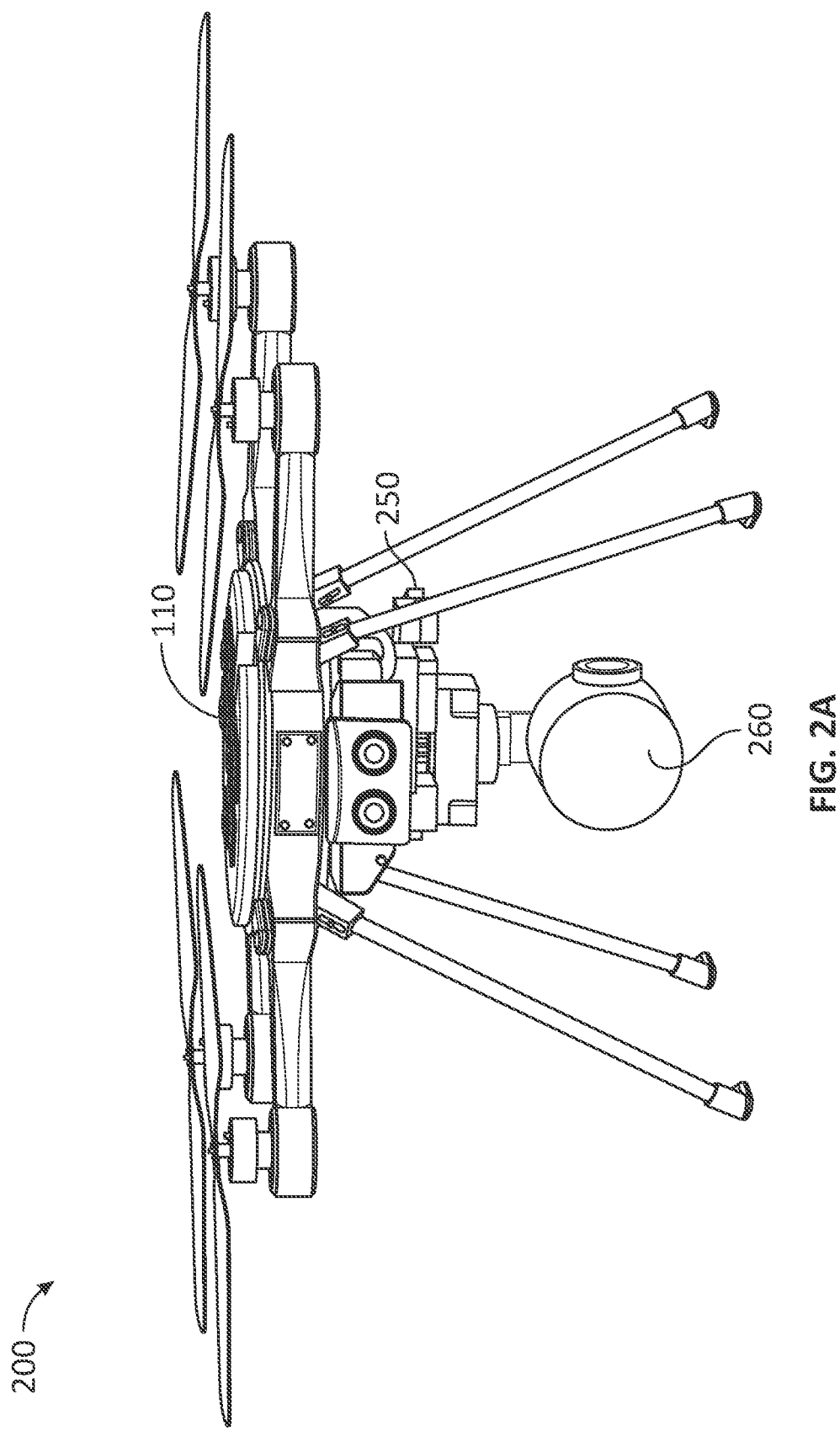

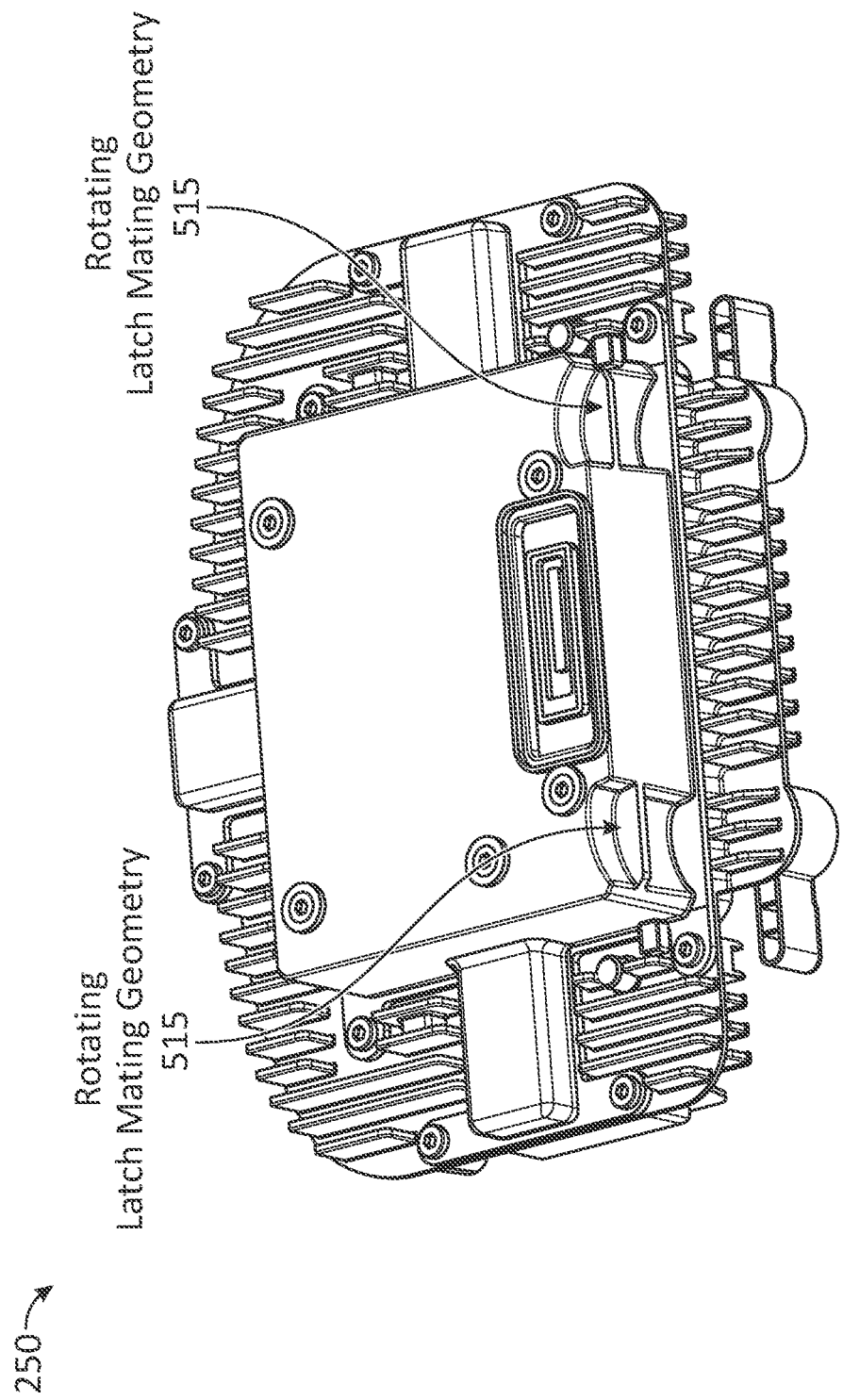

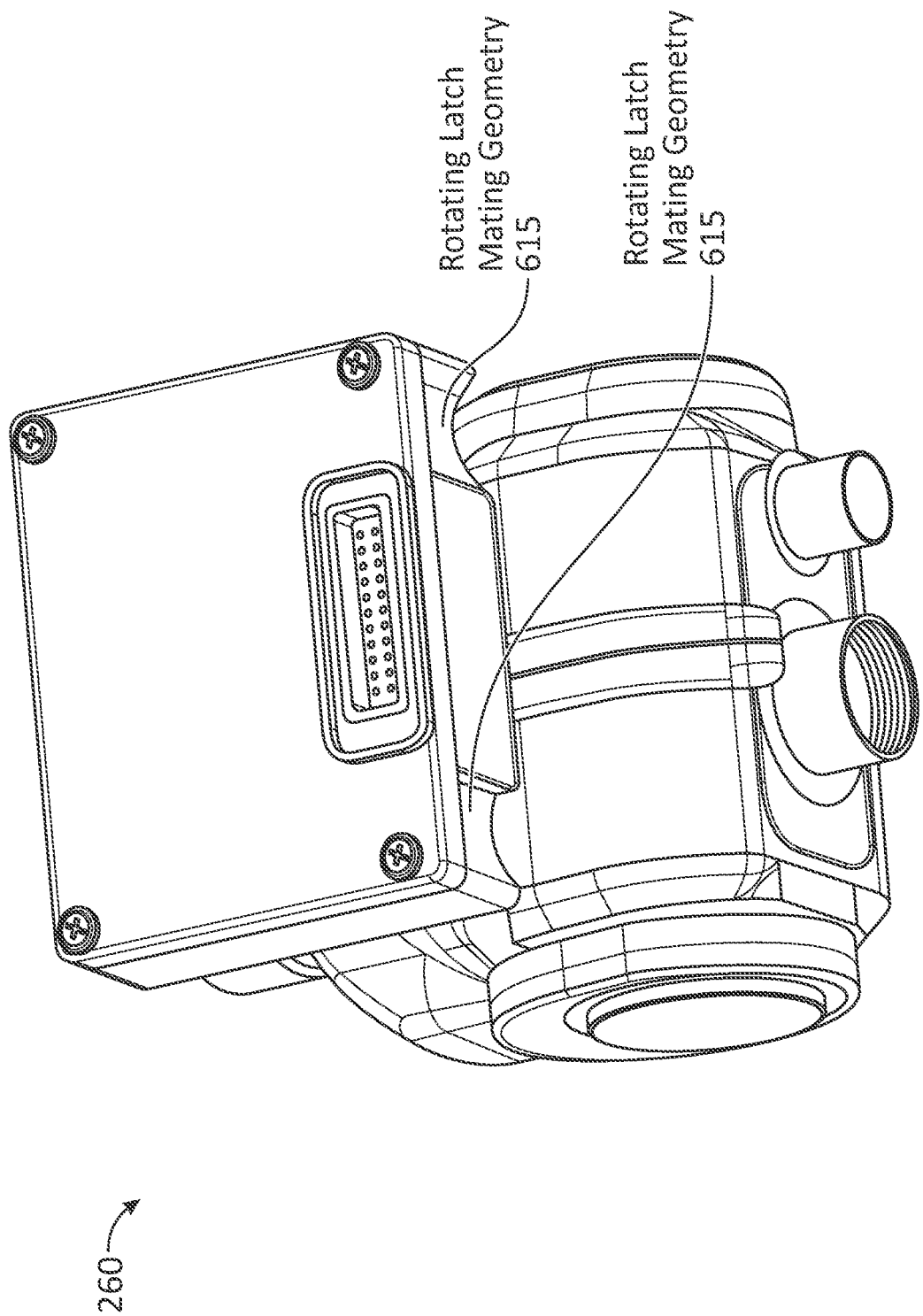

SYSTEMS AND METHODS FOR MODULAR UNMANNED VEHICLES

This application claims the benefit of and priority to U.S. Provisional Patent Application No. 62/945,461 filed Dec. 9, 2019 and entitled "SYSTEMS AND METHODS FOR MODULAR UNMANNED VEHICLES," which is incorporated herein by reference in its entirety.

FIELD

This disclosure generally relates to the fields of unmanned vehicles, and in particular to a system and method for modular unmanned vehicles.

BACKGROUND

An unmanned aerial vehicle (UAV) does not have a human operator located at the UAV. A UAV may include various components such as sensors and measurement and navigation instruments. A UAV may carry a payload (e.g., a camera) which may be configured to perform specific duties such as taking aerial photographs and videos. Advances to functionality of the various components and/or software in a UAV requires replacement or upgrading of the main aircraft components and/or software of the UAV.

SUMMARY

In accordance with some embodiments, there is provided an unmanned vehicle (UV). The UV comprises an aircraft component, an interposer component communicatively and mechanically coupled to the aircraft component, and a payload component communicatively and mechanically coupled to the interposer component. The interposer component comprising a processor and a memory storing instructions which when executed by the processor configured the processor to receive a communication from one of the aircraft component or the payload component, and sent the communication to the other of the aircraft component or the payload component.

In accordance with some embodiments, there is provided a method of controlling a payload of a UV. The UV comprises an aircraft component, an interposer component, and the payload. The method comprises receiving at the interposer component from the aircraft component instructions for controlling the payload, and sending the instructions from the first interposer component to the payload.

In accordance with some embodiments, there is provided a method of processing data from a UV. The UV comprises an aircraft component, an interposer component, and the payload. The method comprises receiving data at the interposer component from the payload, and sending the data from the interposer component to the aircraft component.

In accordance with some embodiments, there is provided a method of controlling a UV. The UV comprises an aircraft component, a first interposer component, and optionally a payload. The method comprises receiving at the first interposer component instructions for controlling the UV, and sending the instructions from the first interposer component to the aircraft component. The instruction received from one of a remote device communicatively connected to the first interposer component, the aircraft component coupled to the first interposer component, or a second interposer component coupled to the first interposer component.

In accordance with some embodiments, there is provided a method of processing data from a UV. The UV comprises an aircraft component, a first interposer component, and the payload. The method comprises receiving the data at the first interposer component, and sending the data from the first interposer component to a ground station. The data may be received from at least one of the payload coupled to the first interposer component, a sensor on the first interposer component, or another interposer component. The data is sent to one of a ground device communicatively connected to the first interposer component, an aircraft component coupled to the first interposer component, or a second interposer component coupled to the first interposer component. The second interposer component may subsequently send the data to one of a subsequent interposer component coupled to the second interposer component or the aircraft component. The subsequent interposer device may subsequently send the data to one of the aircraft device, or the ground device communicatively connected to the subsequent interposer component. The aircraft device may subsequently send the data to the ground device communicatively connected to the aircraft device.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures:

FIG. 2A illustrates an example of a modular UV, in accordance with some embodiments;

FIGS. 5A and 5B illustrate different perspectives of a top/aircraft connector view of an example of an interposer, in accordance with some embodiments;

FIGS. 6A and 6B illustrate example of a toy/connector view of a payload, in accordance with some embodiments;

It is understood that throughout the description and figures, like features are identified by like reference numerals.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

The term unmanned vehicle (UV) is used herein and may include an unmanned aerial vehicle (UAV), an unmanned aircraft (UA), an unmanned aquatic vessel, an unmanned ground vehicle (UGV), and any other vehicle or structure which maybe unmanned, operate autonomously or semi-autonomously, and/or controlled remotely. The UGV may be a remotely controlled, autonomous or semi-autonomous vehicle system which is comprised of a main body and a drive system supported by the main body. In some examples, the drive system is comprised of a propulsion system, such as a motor or engine, and one or more tracks or wheels. Other arrangements, such as a rail or fixed-track ground vehicle, a tether or rope-pulled ground vehicle without a motor or engine, a ground vehicle using balls, sleds or rails, and a ground vehicle which hovers but navigates in proximity to terrain, are also contemplated herein.

Some of the features taught herein are described with reference to embodiments of a UAV having a payload by way of example only. However, the description and features may also apply generally to any UV having central components, an external peripheral connection and a payload.

In some embodiments, an interposer module is mounted to an aircraft's external peripheral connection, and another payload or module can then be mounted to the interposer. The interposer module can be mounted to an existing aircraft as a modular accessory, rather than having to purchase an entirely new aircraft with the integrated solution.

Figure 1:
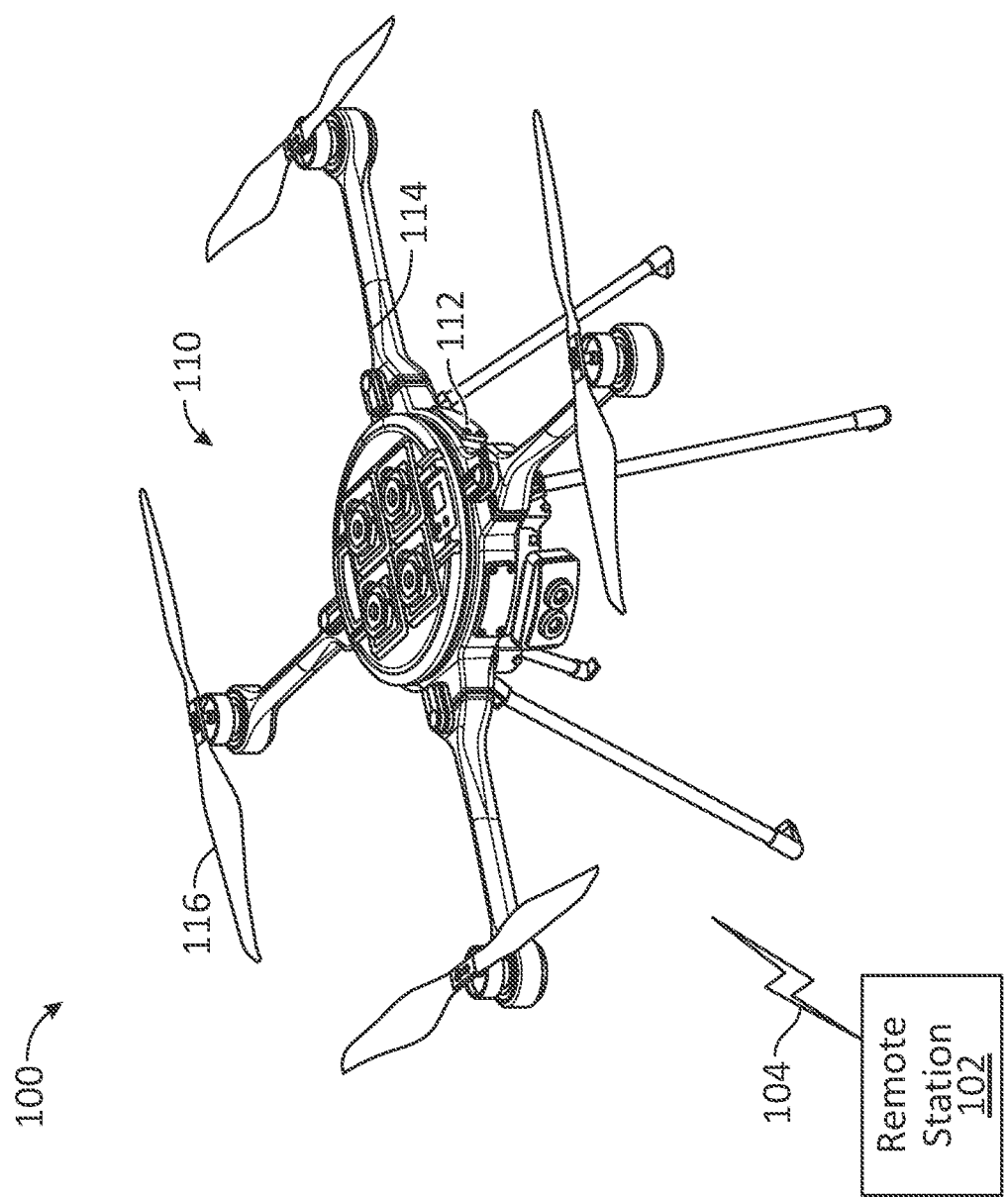
FIG. 1 illustrates an example of an unmanned system (US) comprising an unmanned vehicle (UV) and its associated system elements.

FIG. 1 illustrates an example of an unmanned system (US) 100 (such as an unmanned aircraft system) comprising an unmanned vehicle (UV) 110 (such as an unmanned aerial vehicle) and its associated system elements, in accordance with some embodiments. The UV 110 may be designed to operate with no operator (or pilot) onboard. In the embodiment shown in FIG. 1, the unmanned system 100 includes a remote operator (or pilot) station 102 and command and control links 104 between the UV 110 and the remote operator (or pilot) station 102. The command and control links 104 may include any data link for the purposes of managing the movement (e.g., flight) of the UV 110. The UV 110 may operate autonomously without operator (or pilot) intervention in the management of the movement (e.g., flight) during the entire movement (e.g., flight) operation or a portion thereof. The unmanned system 100 may also include other system elements as may be required at any point during movement (e.g., flight) operation.

In some embodiments, UV 110 may be an unmanned aircraft (UA) or UAV as shown in FIG. 1.

The example UV 110 shown in FIG. 1 may include a body 112, arms 114 extending away from the body 112 to support components such as propellers 116, and legs 118 to support the body 112 when UV 110 is positioned on a surface. When not in use, a propeller may be in a folded position. It is understood that propellers 116 may be in the folded position during storage of the UV 110, while the open position is used during flight operation of the UV 110. Although four arms 114 and four legs 118 are illustrated in the embodiment shown in FIG. 1, it is understood that UV 110 may include any other number of arms 114 and legs 118. As noted above, the example of FIG. 1 pertains to a UAV by way of example only. Other types of UVs may also employ the teachings described herein. The body 112, arms 114, propellers 116 and legs 118, together with other non-payload components of the UV 110, are sometimes referred to herein as "components" or "elements" of the UV 110, and the term "aircraft" is sometimes used herein to refer to the UV 110.

In some embodiments, remote pilot (or operator) station 102 may comprise a ground station. In other embodiments, remote pilot (or operator) station 102 may comprise a client device acting as a control station. In still other embodiments, remote pilot (or operator) station 102 may comprise both a ground station and a client device.

FIG. 2A illustrates an example of a modular UV 200, in accordance with some embodiments. The UV 200 comprises the unmanned vehicle (UV) 110, an interposer component 250, and a payload 260, in accordance with some embodiments. The UV 110 may be designed to operate with no operator (or pilot) onboard. In the embodiment shown in FIG. 2A, the modular UV system 200 is shown with the interposer 250 communicatively and/or mechanically coupled/connected to the UV 110, and the payload 260 communicatively and/or mechanically coupled/connected to the interposer 250.

Figure 2B:
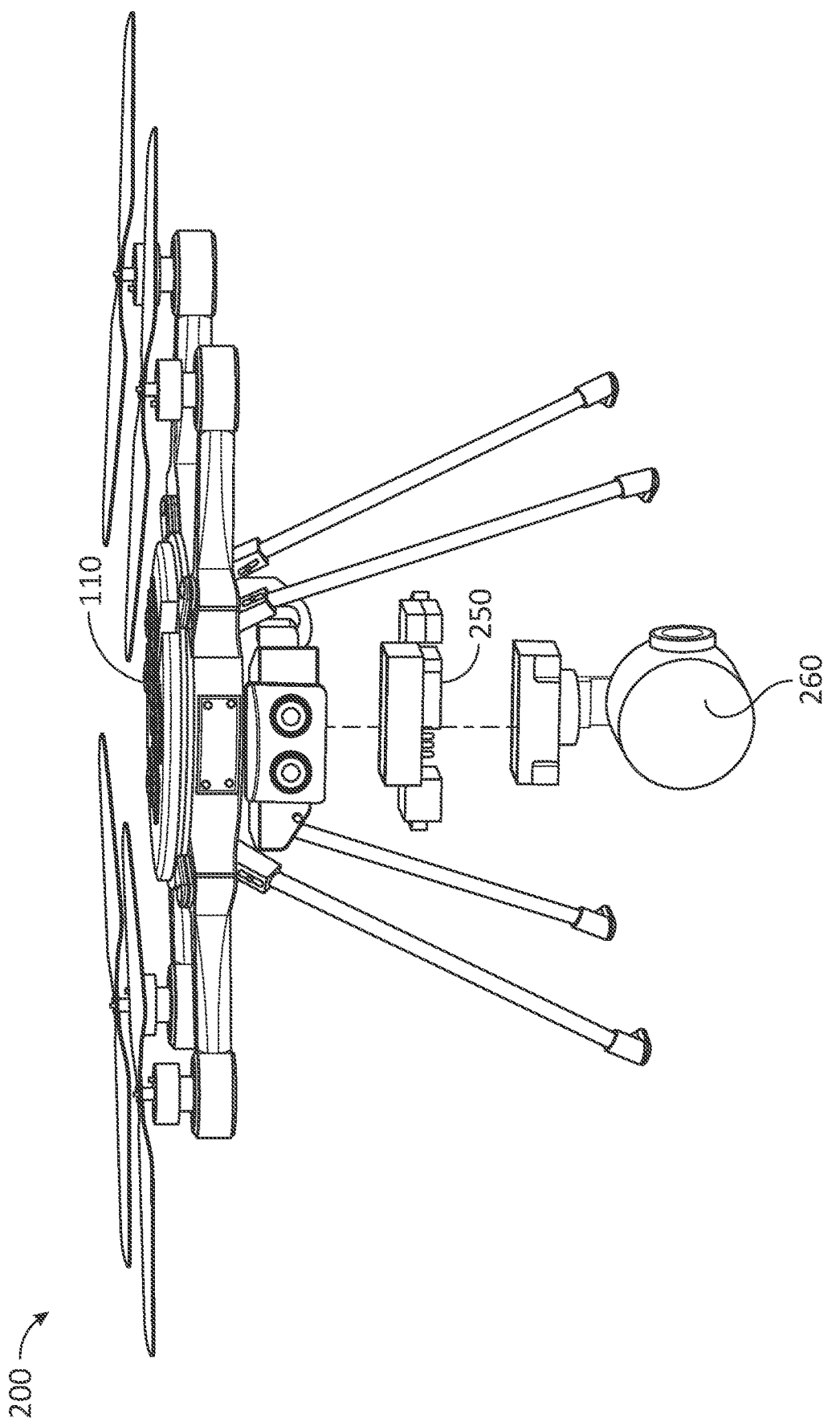
FIG. 2B illustrates another view of modular UV, in accordance with some embodiments FIGS. 3A to 3E illustrated, in component diagrams, examples of data flows for an interposer, in accordance with some embodiments.

FIG. 2B illustrates another view of modular UV 200, in accordance with some embodiments. In FIG. 2B, the UV 110, interposer 250 and payload 260 are shown separated.

The interposer component/module 250 may comprise one or more payload and/or aircraft items such as sensors, radios, memory, instructions, etc. In one implementation, the interposer 250 could be utilized for holding different communications radios in addition to the aircraft onboard radios. In another implementation, the interposer 250 could be utilized to mount cameras for increased vision capability on the aircraft. In each case, the interposer 250 adds functionality in addition to a standard payload 260 and aircraft 110 since it lives between the payload 260 and aircraft 110. In another implementation, the interposer 250 may include sensors (such as cameras, chemical sensors, sense/avoid sensors, etc.).

In some embodiments, an interposer 250 (i.e., interposer component) includes communication modems and antennas. Communications modems and antennas may be built into the interposer module 250 providing flexible communication devices support to the user in addition to the onboard communication hardware built into the aircraft 110.

In some embodiments, the interposer component/module 250 may comprise a type of payload having exterior housings, electronics and/or mechanical components to increase the capability of the base aircraft (i.e., UV 110). As noted above, the interposer 250 assembles between a payload 260 and the aircraft 110 and utilizes the existing payload attachment mechanisms on the aircraft 110.

In some embodiments, the aircraft 110, interposer 250 or payload 260 may be tethered to a system on the ground where the system is the operator station 102, a base station, or in communication with the operator or base station.

In some embodiments, a tether wire may be used as a communication conduit/connection between the system and the aircraft 110, interposer 250 and/or payload 260.

In some embodiments, the interposer 250 may comprise additional, replacement and/or augmented sensors, radios and other communication interfaces, and operating logic and memory of an aircraft 110 and/or a payload 260. In some embodiments, the interposer 250 may be modularly added to a UV 200 without the need to replace the entire aircraft 110 and/or payload 260. In some embodiments, sensitive data may be collected and/or stored by the interposer 250 separate from the aircraft 110 as a security measure. In some embodiments, expensive components may be placed on an interposer 250 and shared by a plurality of UVs 200 on a need bases rather than each UV 200 having its own set of such expensive components separately installed on each aircraft 110.

FIGS. 3A to 3E illustrated, in component diagrams, examples of data flows 300, 310, 320, 330, 340 for an interposer 250, in accordance with some embodiments. It is understood that many other combinations could exist. Data gathered could be (but not limited to): camera video or images, measurements from various types of sensors (gas, thermal, etc.), position and sense/avoid data (radar, lidar, etc.). In all scenarios of FIGS. 3A to 3E, the interposer 250 could be stacked to use multiple interposers 250 for various tasks and so data could flow between them, sent out or stored from a specific one or multiples. Examples of what could be in an interposer 250 (but not limited to): communications modems, cameras, chemical sensors, thermal sensors, sense and avoid sensors such as radar and/or lidar, and mapping sensors.

Figure 3A:
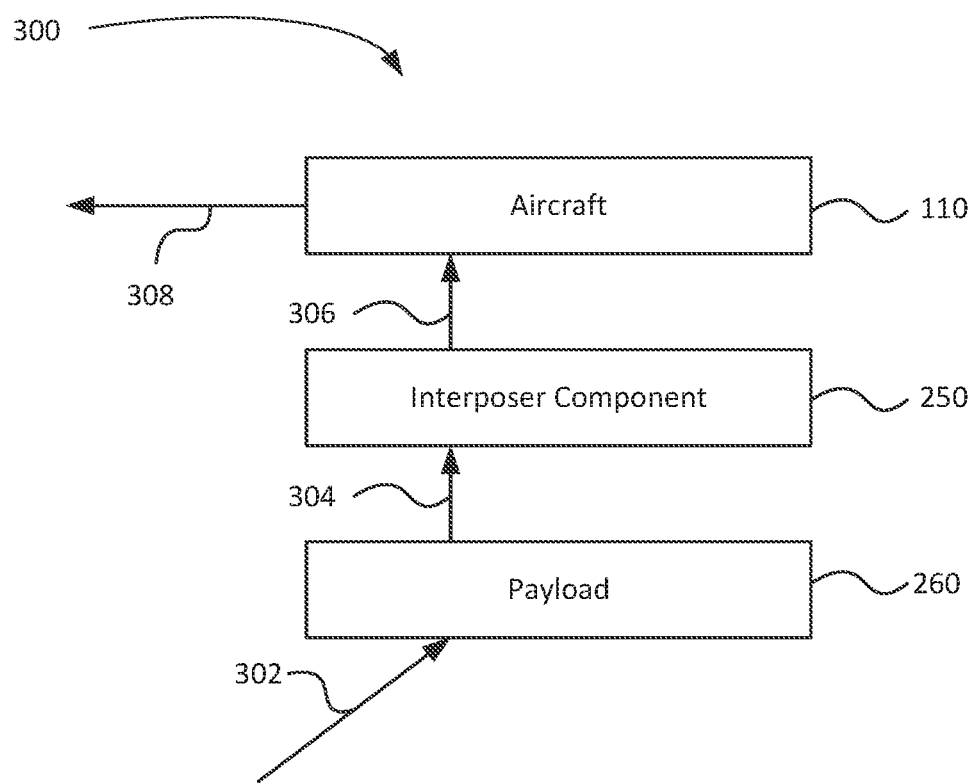

FIG. 3A shows data is gathered 302 by the payload 260, and the payload 260 feeds 304 the data into the interposer 250. Next, the interposer 250 feeds 306 the data into the aircraft 110. The aircraft 110 then processes and outputs 308 the data. In some embodiments, there may be multiple stacked interposers 250.

Figure 3B:
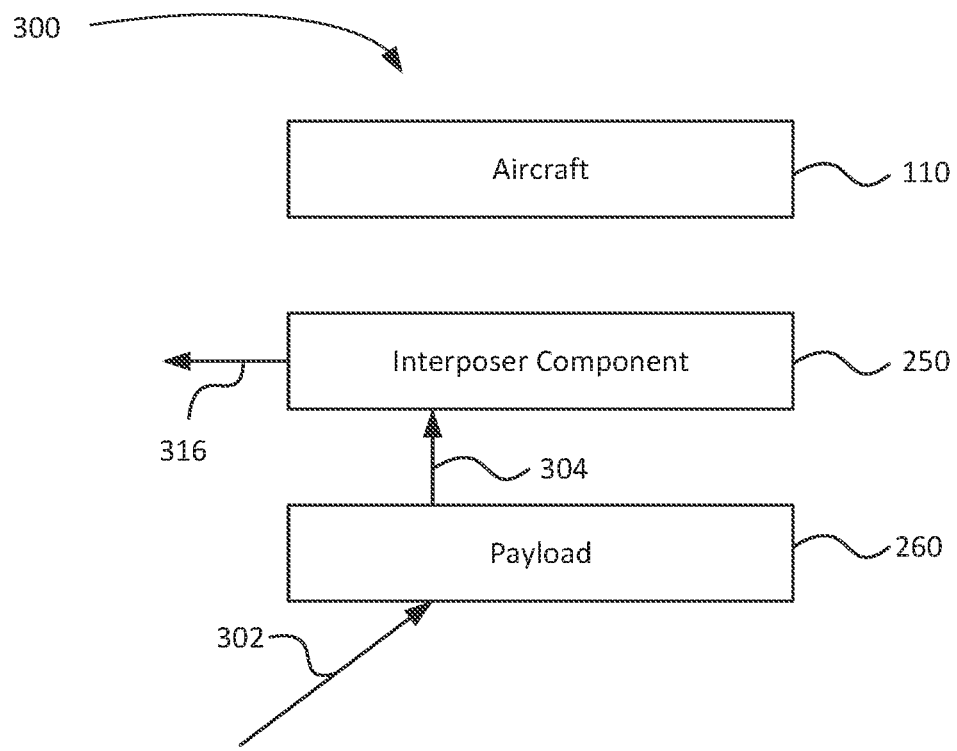

FIG. 3B shows data is gathered 302 by the payload 260, and the payload 260 feeds 304 the data into the interposer 250. Next, the interposer 250 processes and outputs 316 the data. The interposer 250 may also store the data in a repository to be retrieved later. In some embodiments, there may be multiple stacked interposers 250.

Figure 3C:
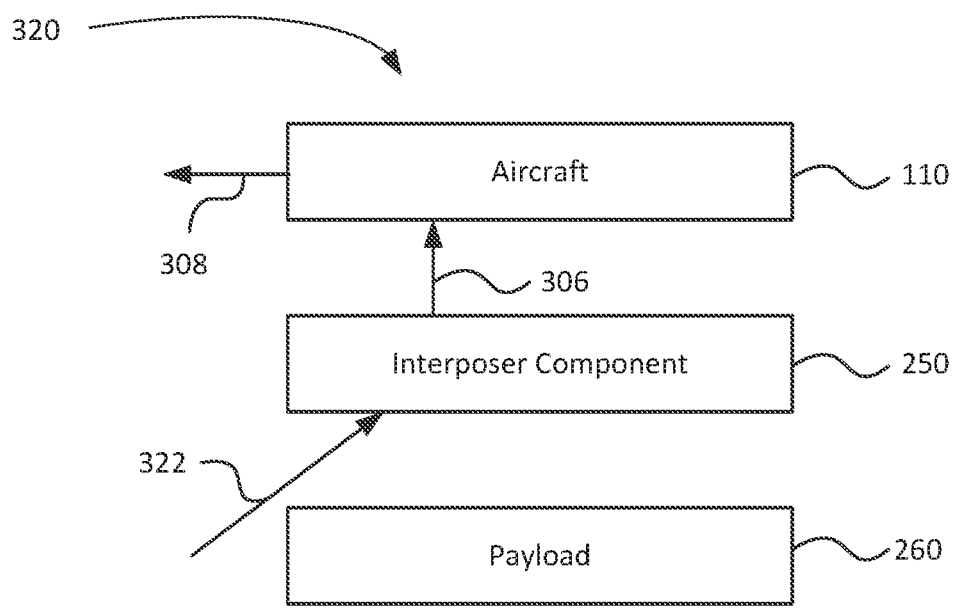

FIG. 3C shows data is gathered 302 by the interposer 250, and the interposer 250 feeds 306 the data into the aircraft 110. The aircraft 110 then processes and outputs 308 the data. In some embodiments, there may be multiple stacked interposers.

Figure 3D:
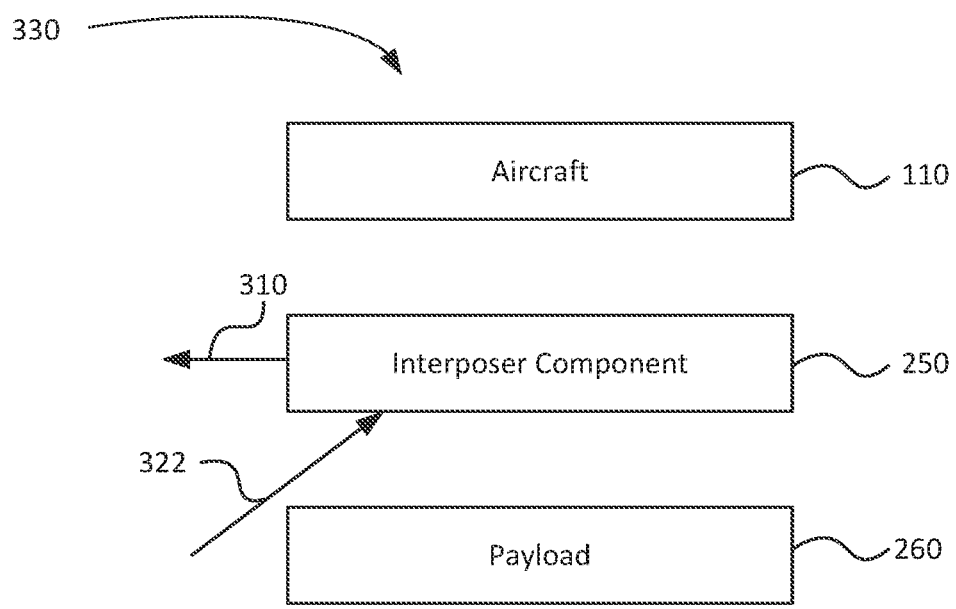

FIG. 3D shows data is gathered 322 by the interposer 250, and the interposer 250 feeds 306 the data into the aircraft 110. Next, the interposer 250 processes and outputs 316 the data. The interposer 250 may also store the data in a repository to be retrieved later. In some embodiments, there may be multiple stacked interposers.

Figure 3E:
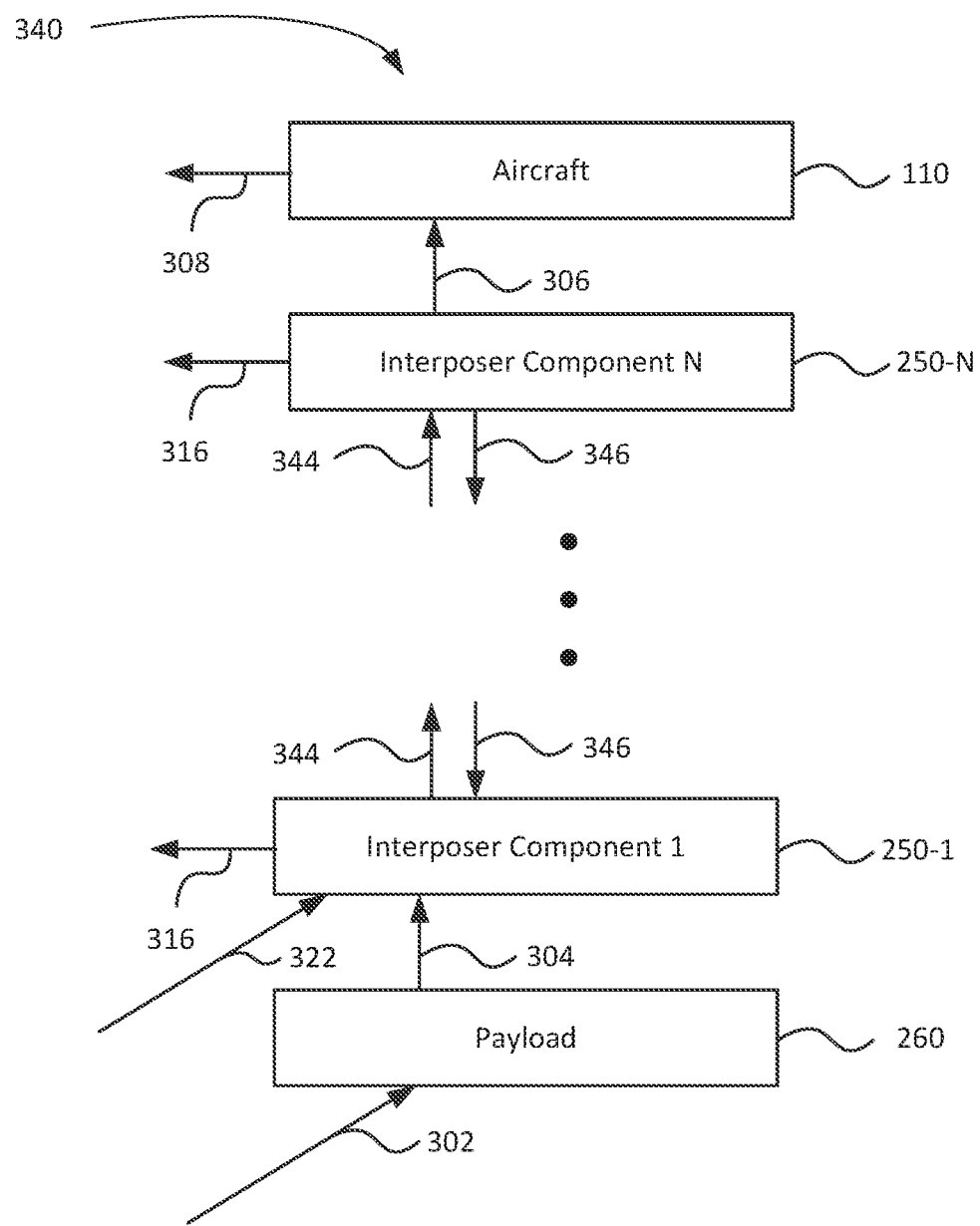

FIG. 3E shows data may be gathered 302 by the payload 260, and the payload 260 may feed 304 the data into a first interposer 250-1. The first interposer 250-1 may also gather 342 data. In some embodiments, there may be multiple stacked interposers 250, where each interposer 250 may exchange 344, 346 data between them. Each interposer 250 may process and output 316 the data. Each interposer 250 may also store the data in a repository to be retrieved later. The final interposer 250-N connected to the aircraft 110 may feed 306 data from the stacked interposer system into the aircraft 110. The aircraft 110 then processes and outputs 308 the data.

Connections between the aircraft 110, interposer 250 and payload 260 will now be discussed.

Figure 4A:
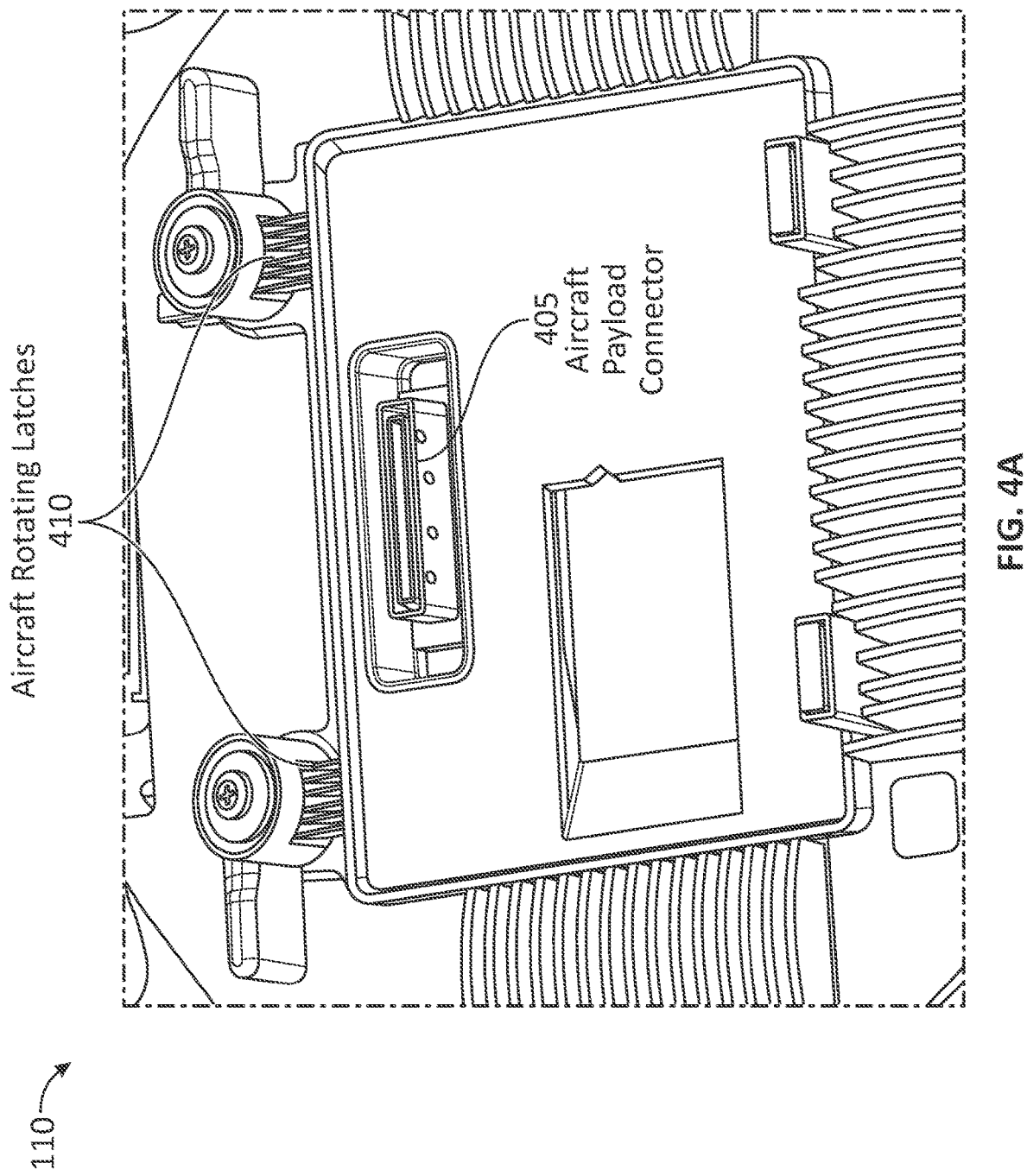
FIGS. 4A and 4B illustrate different perspectives of a bottom/connector partial view of an example of an aircraft, in accordance with some embodiments.
Figure 4B:
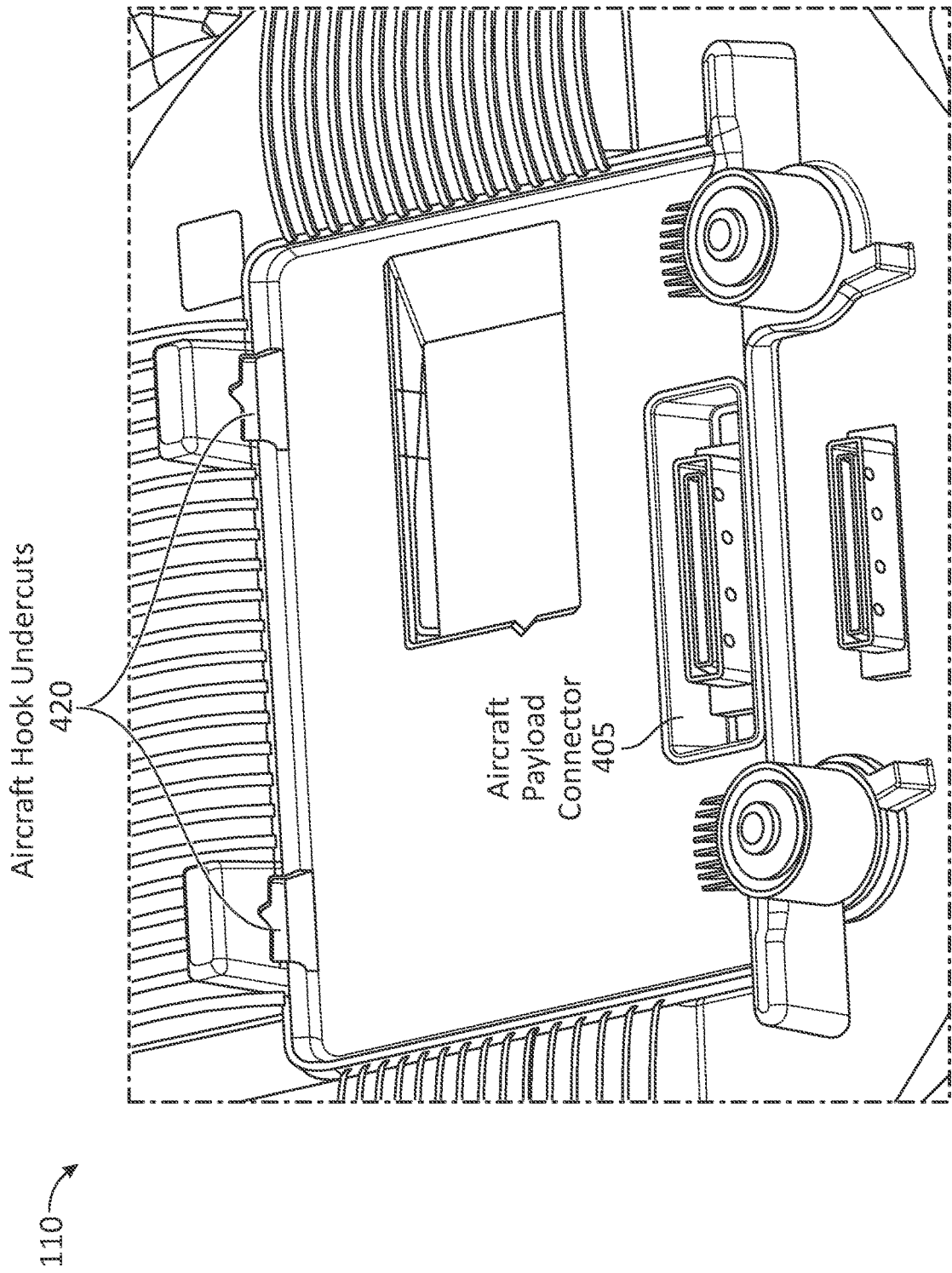

FIGS. 4A and 4B illustrate different perspectives of a bottom/connector partial view of an example of an aircraft 110, in accordance with some embodiments. The aircraft 110 includes an aircraft-payload connector 405, aircraft rotating latches 410, and aircraft hook undercuts 420, each to electrically and/or mechanically connect to an interposer 250 or directly to a payload 260.

Figure 5A:
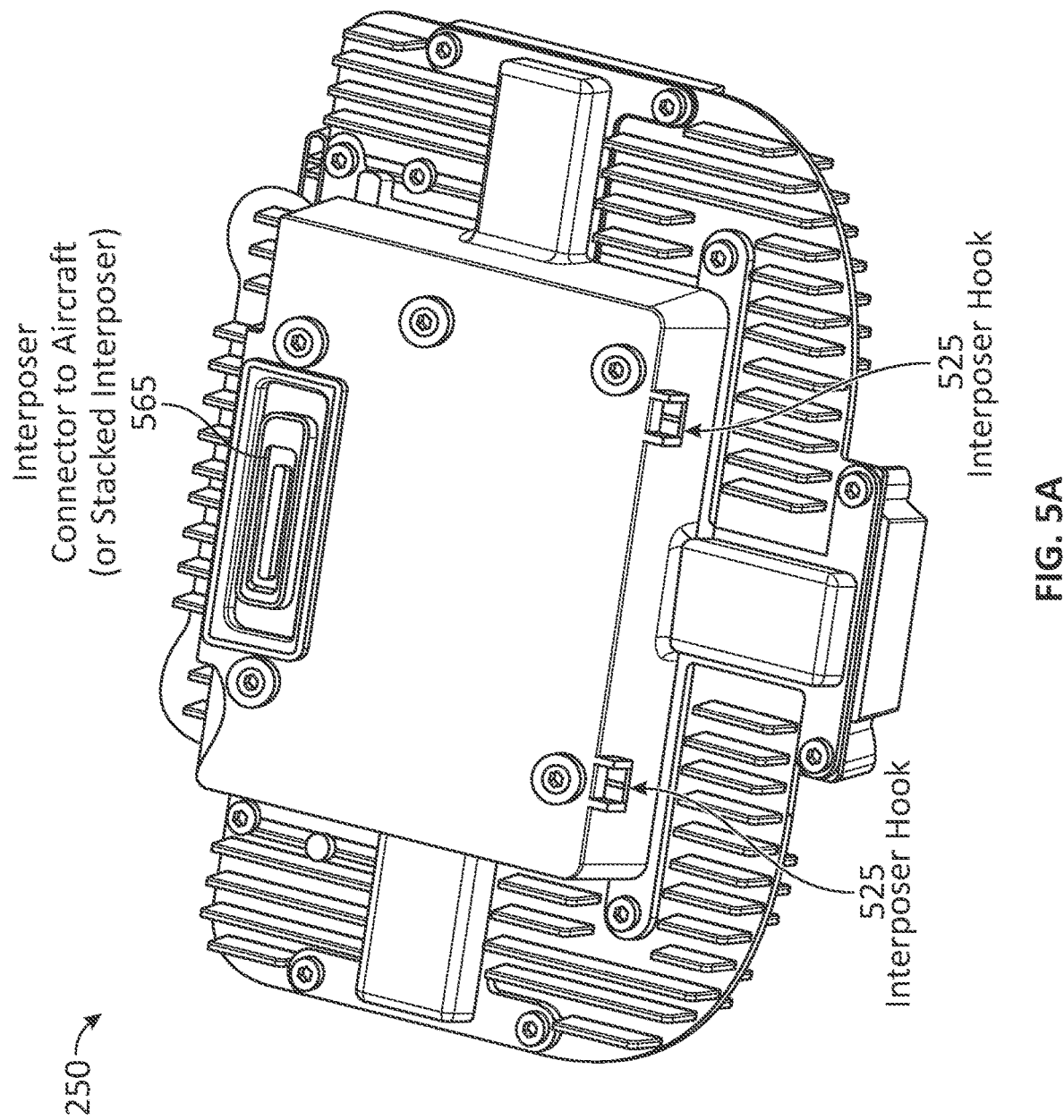
Figure 5C:
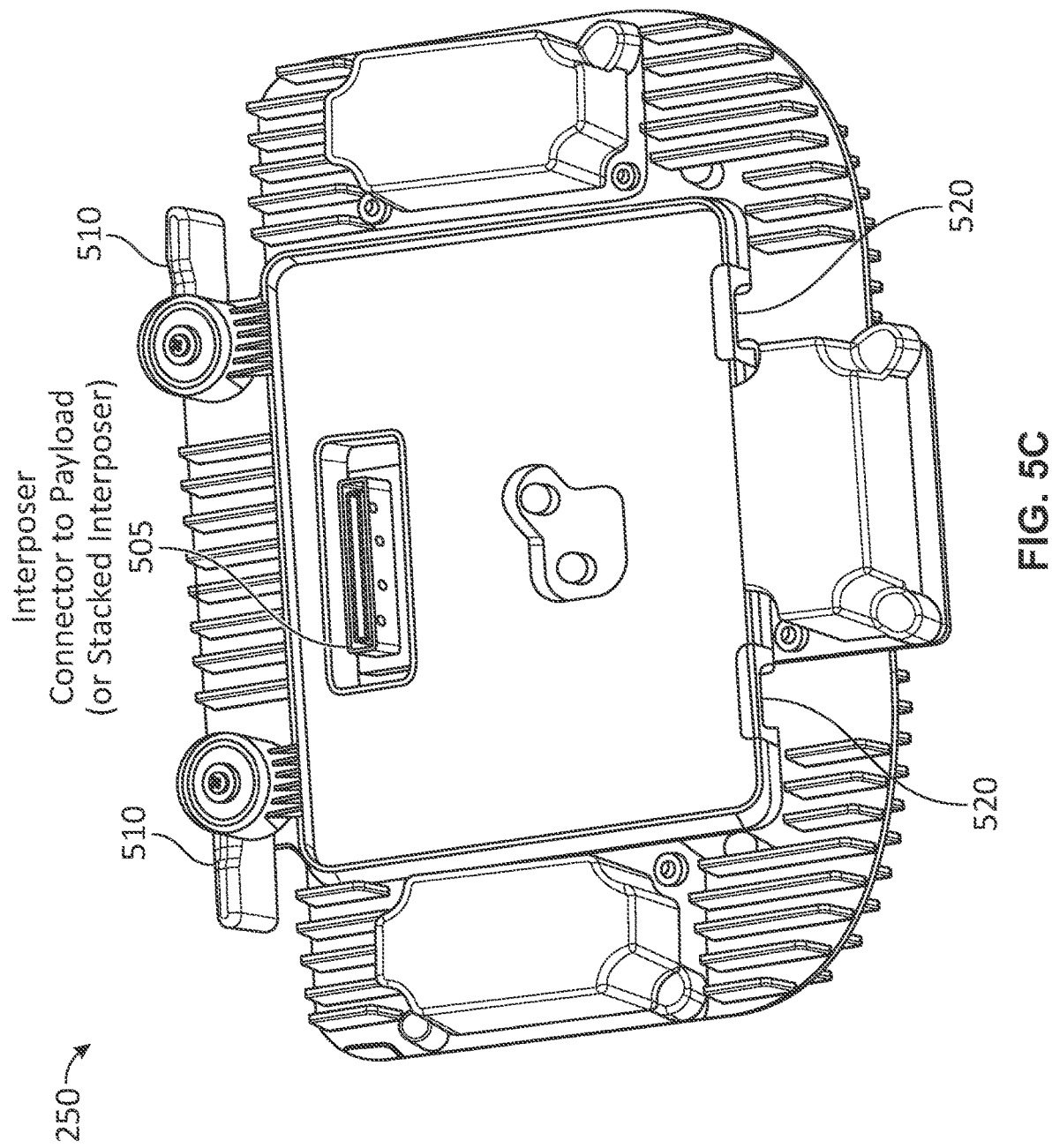
FIG. 5C illustrates a bottom/payload connector view of the interposer, in accordance with some embodiments.

FIGS. 5A and 5B illustrate different perspectives of a top/aircraft connector view of an example of an interposer 250, in accordance with some embodiments. FIG. 5C illustrates a bottom/payload connector view of the interposer 250, in accordance with some embodiments. The interposer 250 includes an interposer-aircraft connector 505 to connect to one of: the aircraft-payload connector 405, or to an interposer-payload connector 565 on another (stacked) interposer 250. The interposer 250 also includes interposer hooks 525 to connect to one of: the aircraft hook undercuts 420 on an aircraft 110, or interposer hook undercuts 520 of another (stacked) interposer 250. The interposer 250 also includes rotating latch mating geometry 515 to connect to the aircraft rotating latches 410 on an aircraft 110 or to interposer hooks 525 on another (stacked) interposer 250. The interposer 250 includes interposer-payload connectors 565 to connect to one of: a payload 260, or to an interposer-aircraft connector 505 of another (stacked) interposer 250.

Figure 6A:
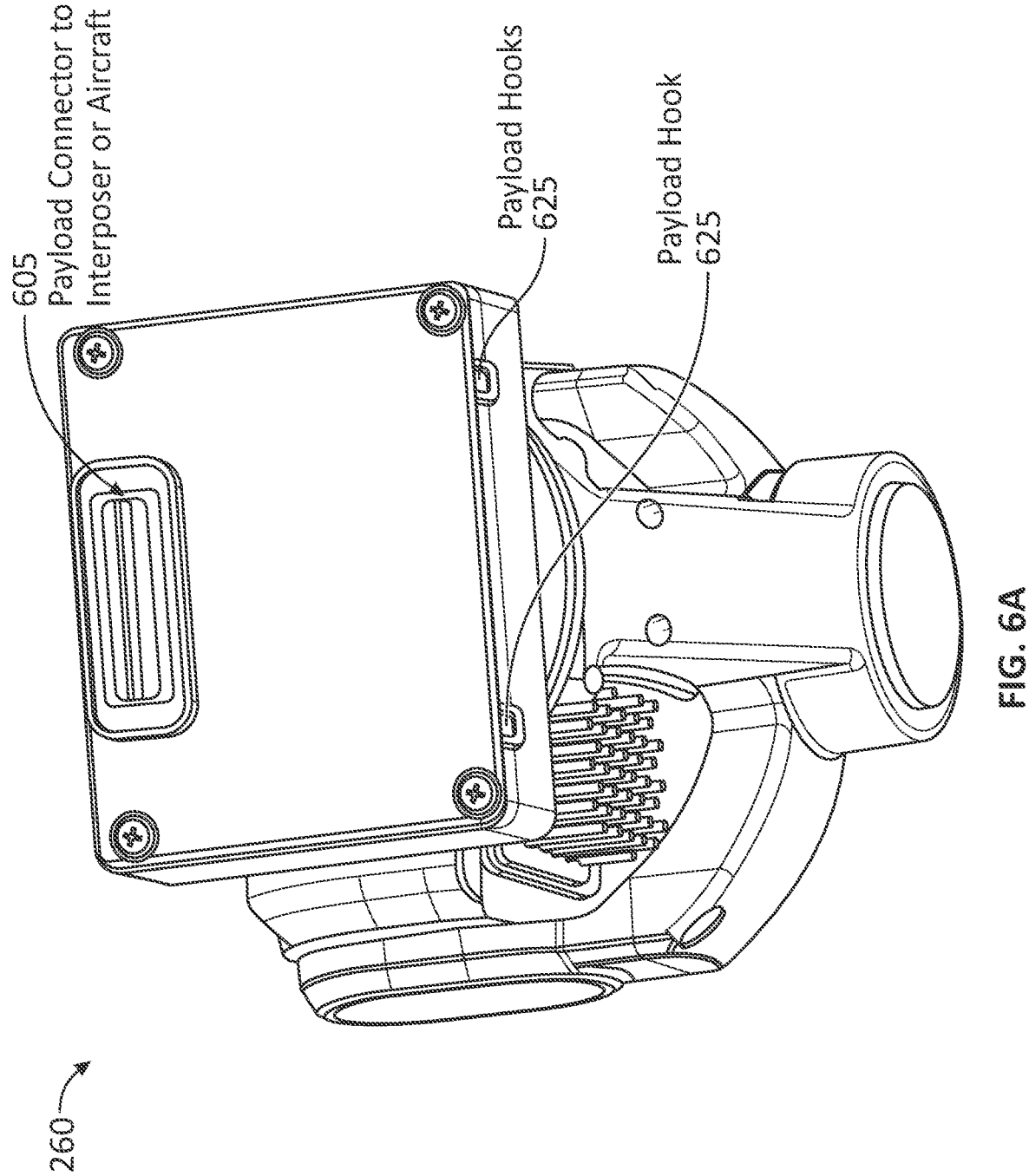

FIGS. 6A and 6B illustrate example of a top/connector view of a payload 260, in accordance with some embodiments. The payload 260 includes a payload-aircraft connector 605 to connect to one of: an interposer-payload connector 505 of an interposer 250, or to the aircraft-payload connector 405 of an aircraft 110). The payload 260 also includes an interposer rotating latch mating geometry 615 to connect to a interposer rotating latches 510 on an interposer 250, or to an aircraft rotating latches 410 of an aircraft 110. The payload 260 also includes payload hooks 625 to connect to one of: aircraft hook undercuts 420, or to the interposer hook undercuts 520.

Figure 7:
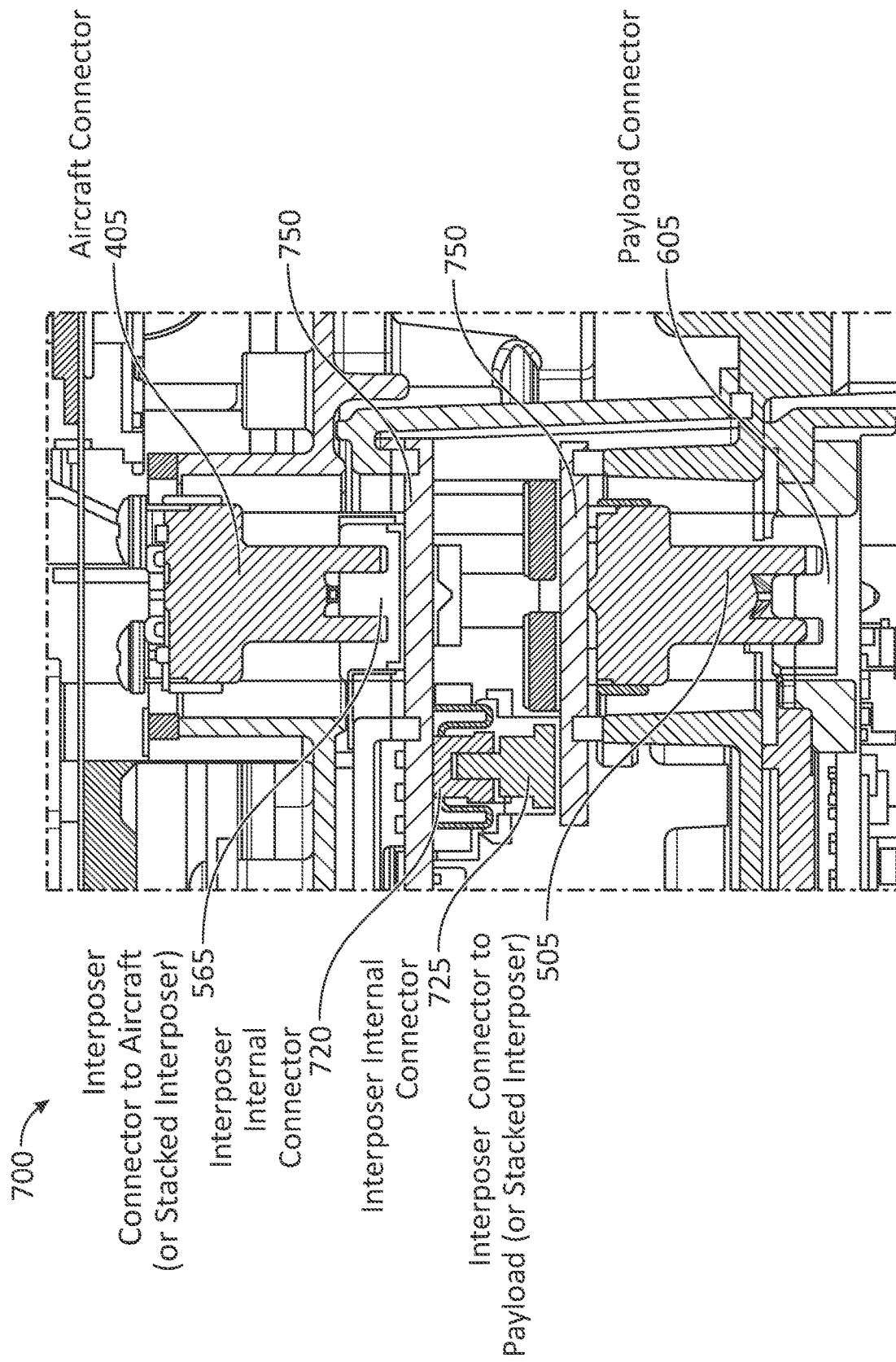
FIG. 7 illustrates a partial internal view of a connected modular UV, in accordance with some embodiments.

FIG. 7 illustrates a partial internal view of another example of a connected modular UV 700, in accordance with some embodiments. The module US 700 includes another example of an interposer 750. The aircraft connector 405 mechanically and electrically connects with interposer-aircraft connector 565 to connect the aircraft 110 with the interposer 750. A first interposer internal connector 720 mechanically and electrically connects with a second interposer internal connector 725 to connect a first interposer 250-1 with a second interposer 250-N. The interposer-payload connector 505 mechanically and communicatively (e.g., via electrical means such as electrical contacts or a tethered wire, or via wireless means such as a radio) connects with the payload connector 605 to connect the interposer 250-N with a payload 260. In some embodiments, the internal connectors 720, 725 are optional and in some implementations there are no internal connectors, or a flexible printed circuit (FPC) connection that is bonded to the printed circuit board (PCB). In some embodiments, the function of the first interposer internal connector 720 may be performed by the interposer-payload connector 505 and the function of the second interposer internal connector 725 may be performed by the interposer-aircraft connector 565.

Figures 8A, 8B:
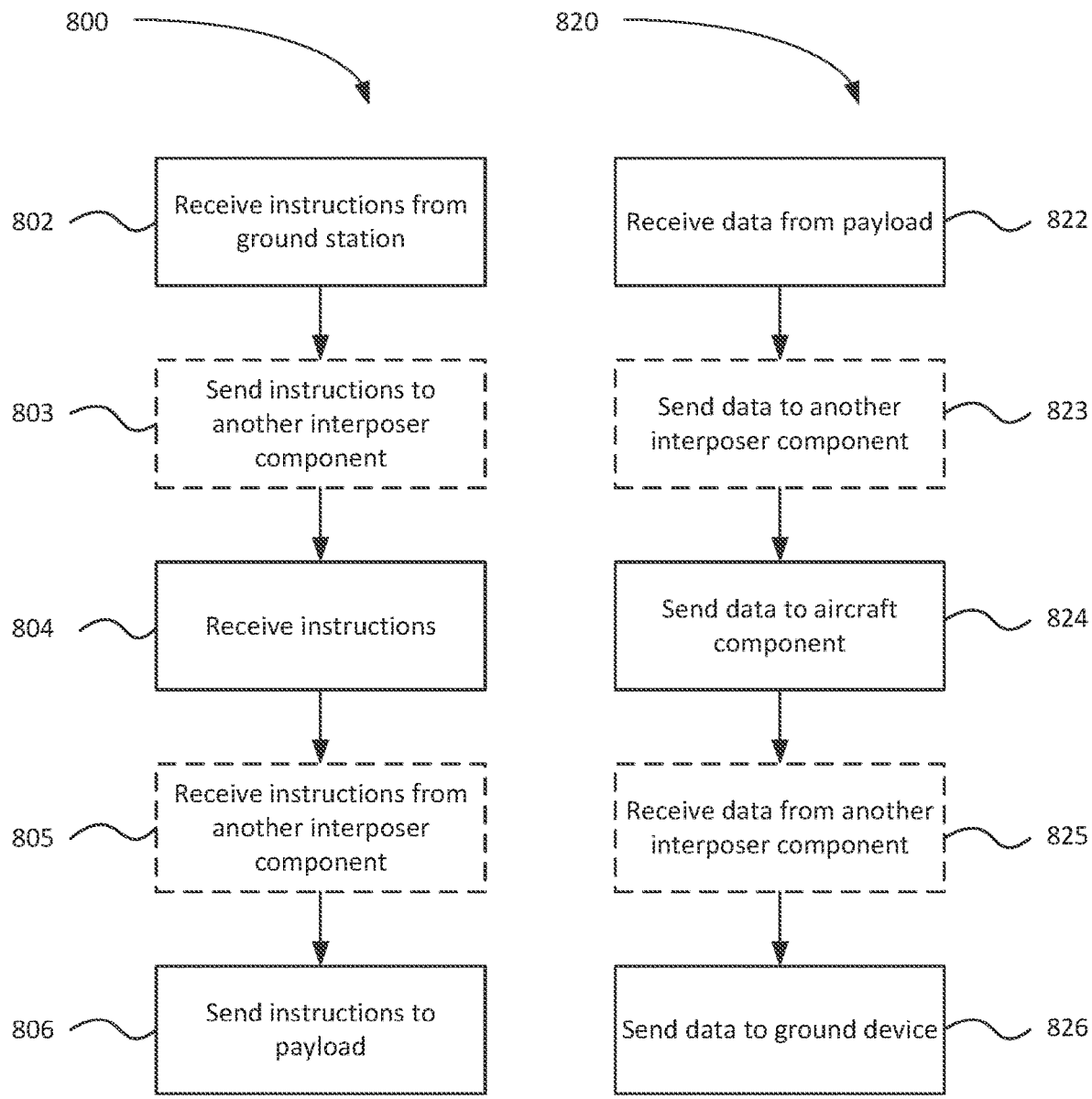
FIG. 8A illustrates, in a flowchart, an example of a method of controlling a payload of a UV, in accordance with some embodiments.
FIG. 8B illustrates, in a flowchart, an example of a method of processing data of a UV, in accordance with some embodiments.

FIG. 8A illustrates, in a flowchart, an example of a method 800 of controlling a payload 260 of a UV 200, 700, in accordance with some embodiments. The method 800 comprises receiving 802 at an aircraft component 110 payload instructions from a ground station. Next, the interposer component 250, 750 receives 804 the payload instructions from the aircraft component 110, and sending 806 the instructions to the payload component 260. If there are more than one interposer components 250, 750, then a previous interposer component 250 sends the payload instructions to a subsequent interposer component 250, 750. In some embodiments, the instructions from the ground station may be received directly at the interposer 250, 750, i.e., replacing steps 802 and 804.

It should be understood that the method 800 can also be modified to control the UV 200, 700 itself. For example, payload instructions may be replaced and/or augmented with UV instructions in the method. In this way, the interposer 250, 750 may replace, supplement and/or augment the radio capabilities of the aircraft 110. For example, an aircraft 110 radio or other communication capabilities may become obsolete or damaged. The interposer 250, 750 may provide replacement, additional and/or different communication capabilities that currently provided on the aircraft 110. The interposer 250, 750 may be used to replace, add and/or supplement sensors and other capabilities on the aircraft 110.

FIG. 8B illustrates, in a flowchart, an example of a method 820 of processing data of a UV 200, 700, in accordance with some embodiments. The method 820 comprises receiving 822 data at the interposer component 250, 750 from the payload 260, and sending 824 the data from the interposer component 250, 750 to the aircraft component 110. The aircraft component 110 may then send 826 the data to a ground station. If there are more than one interposer components 250, 750, then a previous interposer component 250, 750 sends the data to a subsequent interposer component 250, 750. In some embodiments, the instructions to the ground station may be sent directly from the interposer 250, 750, i.e., replacing steps 824 and 826.

Figure 8C:
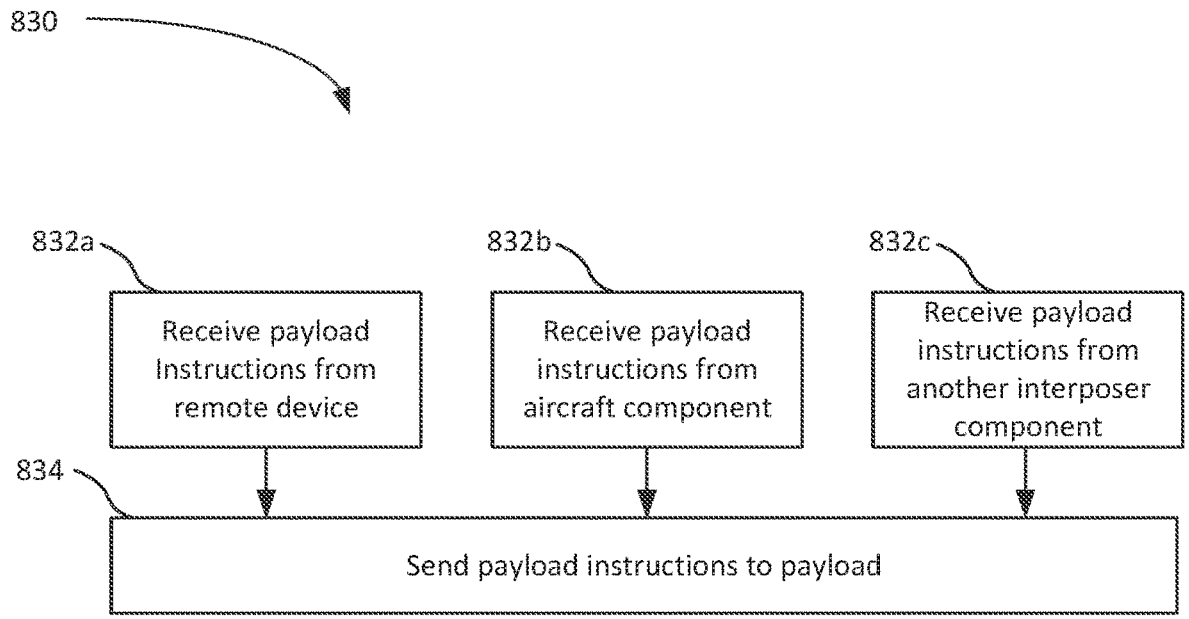
FIG. 8C illustrates, in a flowchart, another example of a method of controlling a payload of a UV, in accordance with some embodiments.

FIG. 8C illustrates, in a flowchart, another example of a method 830 of controlling a payload 260 of a UV 200, 700, in accordance with some embodiments. The method 830 comprises receiving 832a, 832b, 832c at a first interposer component 250-1, 750-1 instructions for controlling the payload 260, and sending 834 the instructions from the first interposer component 250, 750 to the payload 260. The instructions may be received from one of a remote device communicatively connected to the first interposer component 250-1, 750-1 (832a), the aircraft component 110 coupled to the first interposer component 250-1, 750-1 (832b), or another interposer component 250-N, 750-N coupled to the first interposer component 250-1, 750-1 (832c).

Figure 8D:
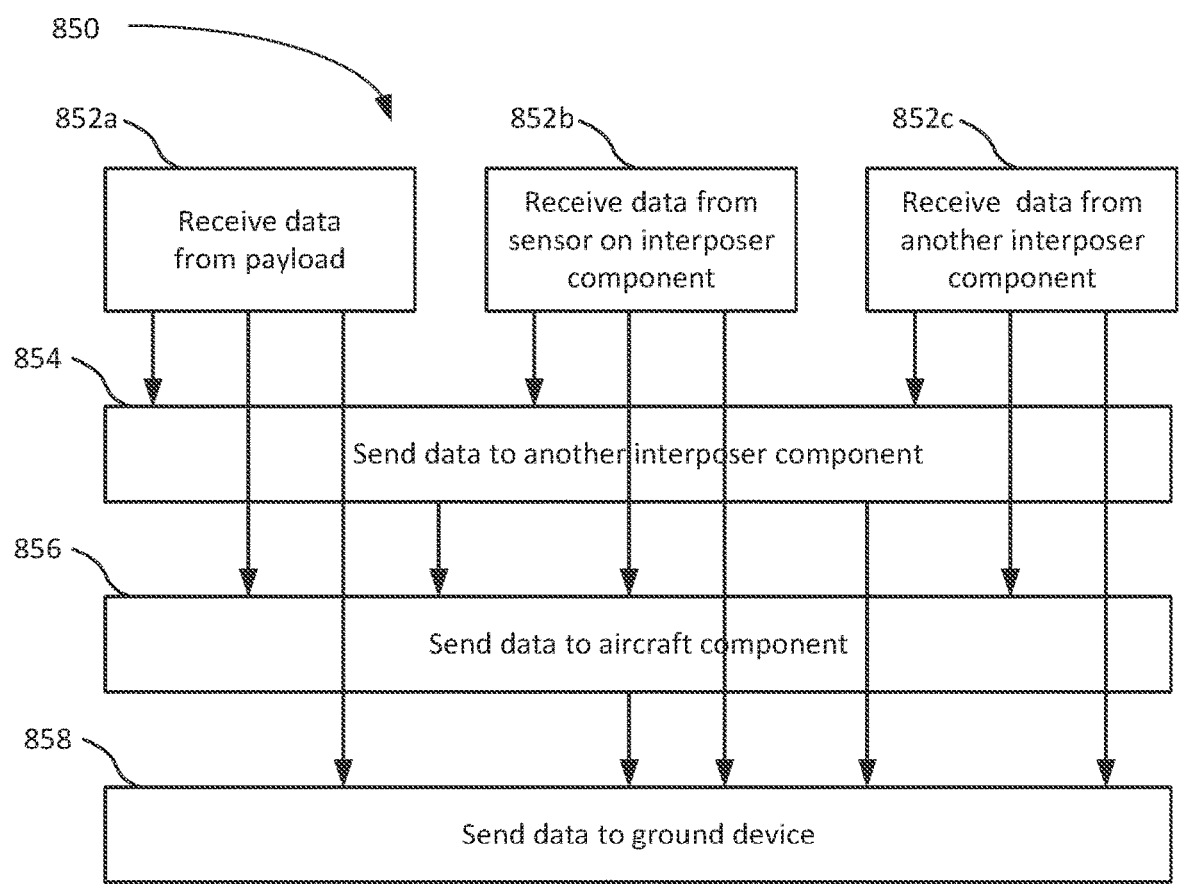
FIG. 8D illustrates, in a flowchart, another example of a method of processing data of a UV, in accordance with some embodiments.

FIG. 8D illustrates, in a flowchart, another example of a method 850 of processing data of a UV 200, 700, in accordance with some embodiments. The method 850 comprises receiving 852a, 852b, 852c the data at the first interposer component 250-1, 750-1. The data may be received from at least one of the payload 260 coupled to the first interposer component 250-1, 750-1 (852a), a sensor on the first interposer component 250-1, 750-1 (852b), or another interposer component 250, 750 (852c). The data is sent to one of a ground device communicatively connected to the first interposer component 250-1, 750-1 (858), an aircraft component 110 coupled to the first interposer component 250-1, 750-1 (856), or a second interposer component 250-N, 750-N coupled to the first interposer component 250-1, 750-1 (854). The second interposer component 250-N, 750-N may subsequently send the data to the ground station (858) or the aircraft component 110 (856). The subsequent interposer component 250-N, 750-N may subsequently send the data to one of the aircraft device 110 (856), or the ground device communicatively connected to the subsequent interposer component 250-N, 750-N (858). The aircraft device 110 may subsequently send the data to the ground device communicatively connected to the aircraft device 110 (858).

Figure 9:
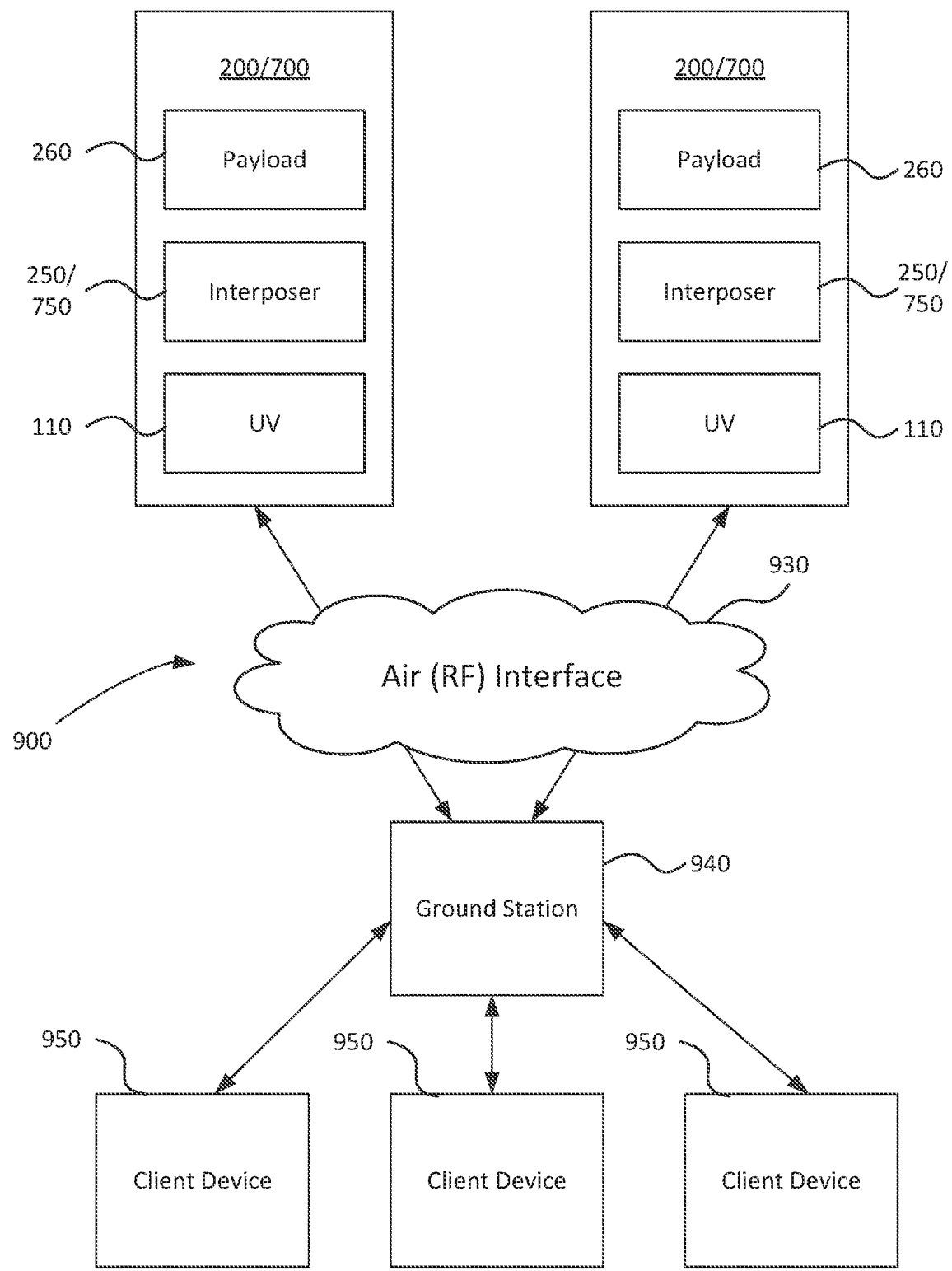
FIG. 9 illustrates, in a component diagram, an example of a US, in accordance with some embodiments.

FIG. 9 illustrates, in a component diagram, an example of a US 900, in accordance with some embodiments. The US 900 may include one or more modular vehicles 200, 700, a ground station 1040, and one or more client devices 1050. The US 900 may include more than one ground station 940. A loaded vehicle 200, 700 may include a UV 110, an interposer 250 and a payload 260. The ground station 940 may communicate with one or more loaded vehicles 200, 700 via air interface 930 which may include satellite communication or other types of radio frequency communication between station 940 and loaded vehicles 200, 700. The communication between the ground station 940 and the US 900 may be directly with the UV 110, or an interposer 250, 750. The ground station 940 may communicate with one or more client devices 950 through a number of communication links and network interfaces, such as a wired or wireless local area network, a cellular network (such as global system for mobile (GSM) communication, long-term evolution (LTE), fifth generation (5G), or other cellular networks) or a proprietary or private radio link.

A loaded vehicle 200, 700 may include a UV 110, and an interposer 250 a payload 260. The interposer 250, 750 may be as described above. payload 260 may include one or more of: a freight package, a camera, a measuring device, one or more sensors, and a storage device (e.g., a universal serial bus (USB) drive). A payload 260 can also include, for example, flame retardant for use in a forest fire. Generally speaking, a payload 260 may be any cargo or equipment a UV 110 carries that is not necessarily required for flight, control, movement, transportation and/or navigation of the UV 110 itself. A payload 260 may be attached or coupled to an interposer 250, 750 in a number of ways. For example, a payload 260 may be connected to the interposer 250, 750 by one or more interfaces such as an Ethernet connection, a controller area network (CAN) bus connection, a serial connection, an inter-integrated circuit ($I^2C$) connection, a printed circuit board (PCB) interface, a USB connection, a proprietary physical link, and so on.

The ground station 940 may be configured to communicate with one or more loaded vehicles 200, 700 (or simply "vehicles 200, 700" hereinafter). The ground station 940 may also communicate with UVs 110 not carrying any payload. The ground station 940 may control one or more modular vehicles 200, 700, one or more UVs 110, one or more interposers 250, 750, one or more payloads 260 concurrently in real-time or near real-time. The ground station 940 may also receive commands and/or data from one or more client devices 950, process the commands or data, and transmit the processed commands or data to one or more vehicles 200, 700, UVs 110, interposers 250, 750 or payloads 260. In some embodiments, the ground station 940 may receive user input directly at a user console (not shown) without client devices 950. In some embodiments, a client device 950 may be the user console for the ground station 940.

A client device 950 may serve to control the operation of one or more vehicles 200, 700, UVs 110, interposers 250, 750 or payloads 260 remotely. In some embodiments, a client device 950 may also be referred to as a control station. The client device 950 may be implemented as a computing device.

A user, such as an owner or operator of a UV 110, may use a client device 950 to communicate with, and to control, one or more vehicles 200, 700, UAVs 110, interposers 250, 750 or payloads 260. A client device 950 may have an application implemented for communicating with or controlling vehicles 200, 700, UVs 110, interposers 250, 750 or payloads 260. Such an application may be launched as a stand-alone process in an operation system, or within an Internet browser. The user may enter information through a user interface provided by the application. In addition, information relating to, or from, the vehicle 200, 700, UV 110, interposer 250, 750 or payload 220 may be displayed by the application on a display of client device 950. Client device 950 may communicate with, or control, vehicle 200, 700, UV 110, interposer 250, 750 or payload 260 through the ground station 940, or in some embodiments, client device 950 may communicate with, or control, vehicle 200, 700, UV 110, interposer 250, 750 or payload 260 directly without the ground station 940.

In some embodiments, the client device 950 is operable to register and authenticate users (using a login, unique identifier, biometric information or password for example) prior to providing access to loaded vehicles, payloads, UVs, applications, a local network, network resources, other networks and network security devices. The client device 950 may serve one user or multiple users.

In some embodiments, communication hardware and communication links may include a network interface to enable computing device to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these.

Either or both of the ground station 940 and the client device 950 may be configured to control vehicle 200, 700, UV 110, interposer 250, 750 or payload 260. Flight control, navigation control, movement control, and other types of command signals may be transmitted to the UV 110 for controlling or navigating one or more of vehicle 200, 700, UV 110, interposer 250, 750 or payload 260. Movement control, and other types of command signals may be transmitted to the interposer 250, 750 for controlling one or more of interposers 250, 750 or payload 260. Command signals may include command data (e.g., coordinate information) required to execute flight control, movement control or navigation control of one or more of vehicle 200, 700, UV 110, interposer 250, 750 or payload 260.

Either or both of the ground station 940 and the client device 950 may be configured to receive data from one or more of vehicle 200, 700, UV 110, interposer 250, 750 or payload 260. For example, payload 260 may transmit audio, video or photographs to the ground station 940 or the client device 950.

Figure 10:
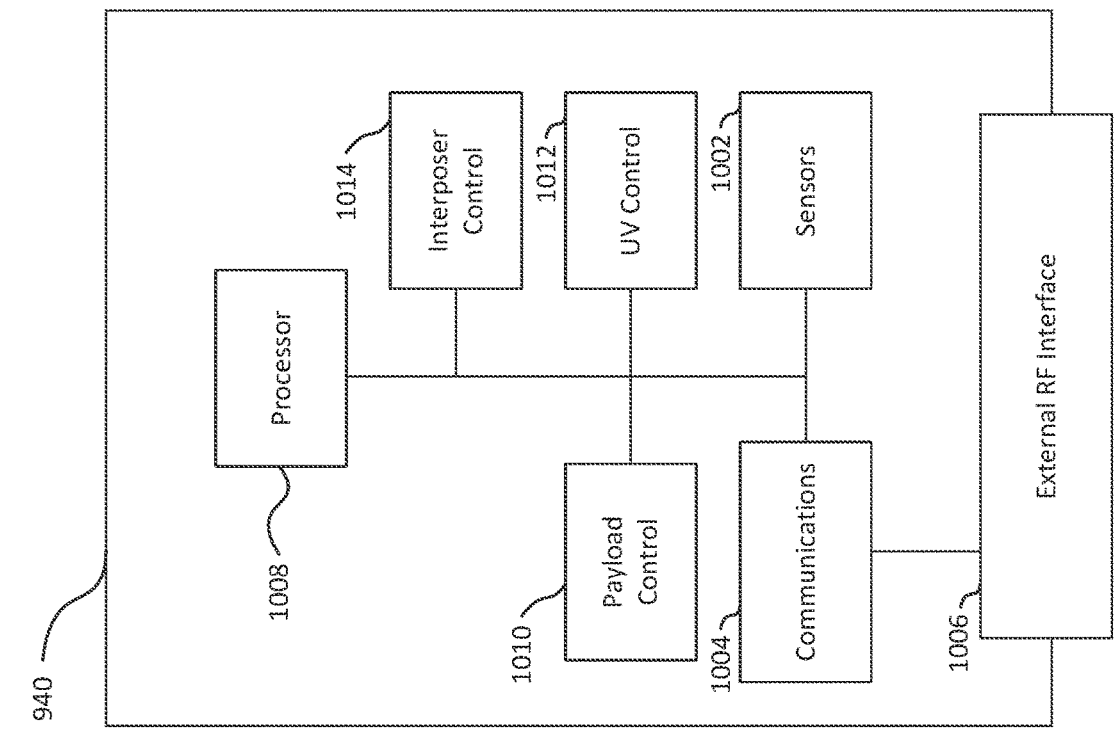
FIG. 10 illustrates, in a component diagram, an example of a ground station, in accordance with some embodiments.

FIG. 10 illustrates, in a component diagram, an example of a ground station 940, in accordance with some embodiments. The ground station 940 may include a sensor subsystem 1002 (which may include a global positioning system (GPS) subsystem), a communications module 1004 configured to process received data packets, and to prepare data packets for transmission through an external radio frequency (RF) interface 1006, an external RF interface configured to communicate with an external RF interface on a UV 110 or interposer 250, 750, a processor or controller 1008, a payload control module 1010, a UV control module 1012, and an interposer control module 1014. The sensor subsystem 1002 may be used to acquire environmental data if the ground station 240 is proximate or near the UV 110, where the environmental data may be used for controlling the UV 110, the interposer 250, 750, the payload 260, or the loaded vehicle 200, 700, such as location data, weather data, and so on. The payload control module 1010 may generate command signals for controlling the payload 260, the UV control module 1012 may general command signals for controlling the UV 110, and the interposer control module 1014 may generate command signals for controlling the interposer 250, 750. Both types of control commands may be processed by the communications module 1004 and transmitted to the UV 110, interposer 250, 750 and the payload 260 via external RF interface 1006. The ground station 940 may also include an operator console (not shown).

Figure 11:
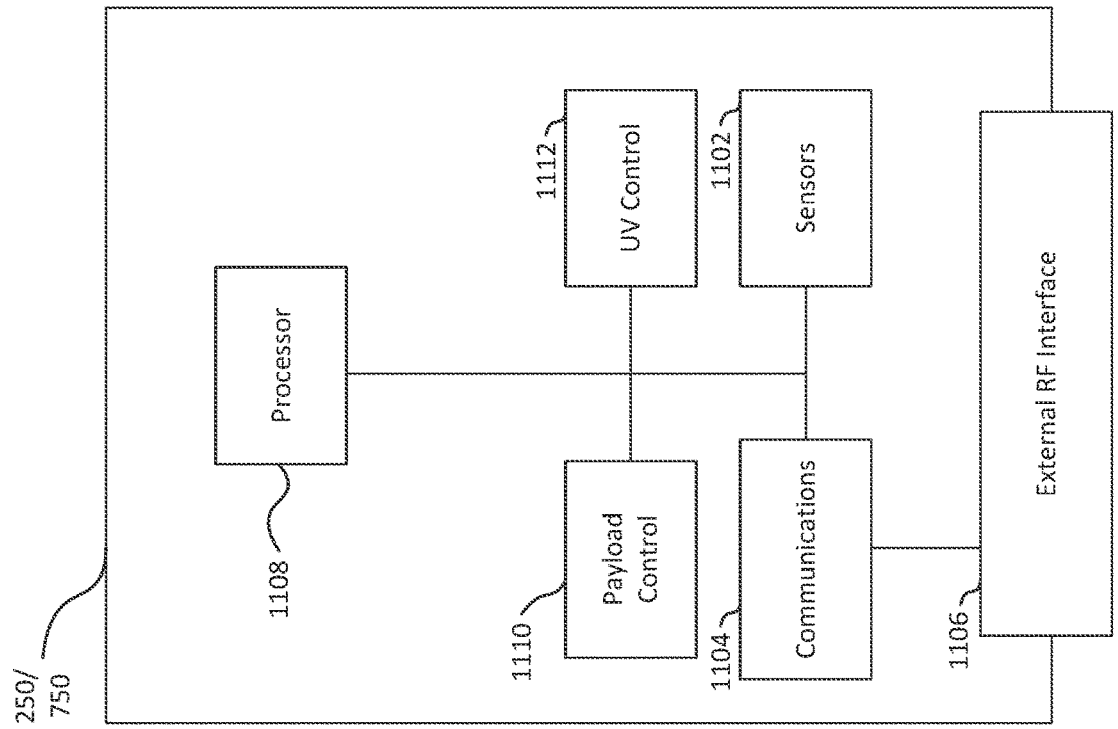
FIG. 11 illustrates, in a component diagram, an example of an interposer, in accordance with some embodiments.

FIG. 11 illustrates, in a component diagram, an example of an interposer 250, 750, in accordance with some embodiments. The interposer 2500 may include a sensor subsystem 1102 (which may include a global positioning system (GPS) subsystem); a communications module 1104 configured to process received data packets, and to prepare data packets for transmission through an interface 1106; an interface 1106 configured to communicate with an interface on a UV 110, payload 260 or ground station 940; a processor or controller 1108, a payload control module 1110 and a UV control module 1112. The sensor subsystem 1102 may be used to acquire environmental data, where the environmental data may be used for controlling the UV 110, the interposer 250, 750, the payload 260, or the loaded vehicle 200, 700, such as location data, weather data, and so on. The payload control module 1110 may generate command signals for controlling the payload 260, and the UV control module 1112 may general command signals for controlling the UV 110. Both types of control commands may be processed by the communications module 1104 and transmitted to the UV 110, and the payload 260 via interface 1106.

Figure 12:
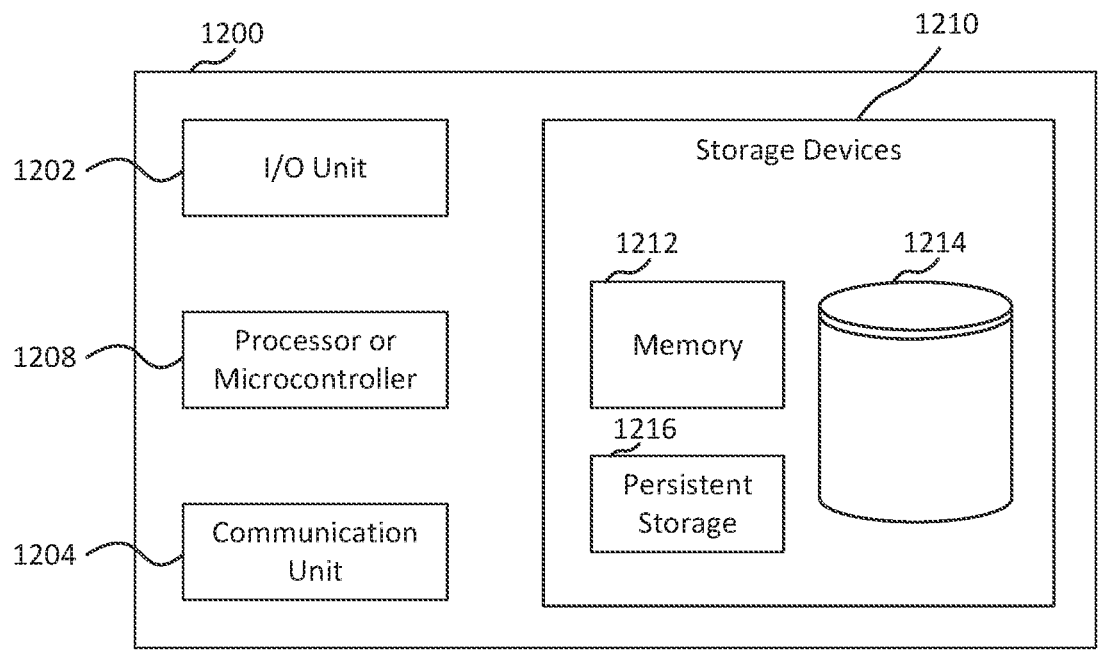
FIG. 12 illustrates, in a component diagram, an example of a control station, in accordance with some embodiments.

FIG. 12 illustrates, in a component diagram, an example of a control station 1200, in accordance with some embodiments. The control station 1200 may be a client device 950, and/or a ground station 940 having a display, and/or a remote pilot station 102. In some embodiments, the control station 1200 may be implemented on a tablet, phone, computer, purpose-built control station or other capable device or system. A processor or controller 1208 can execute instructions in memory 1212 to configure the communications module 1104, the payload control module 1110, the UV control module 1112, and the interposer control module 1114. A processor 1208 can be, for example, any type of general-purpose microprocessor or microcontroller, a digital signal processing (DSP) processor, an integrated circuit, a field programmable gate array (FPGA), a reconfigurable processor, or any combination thereof.

Memory 1212 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 1210 include memory 1212, databases 1214, and persistent storage 1216.

Each I/O unit 1202 enables the control station 1200 to interconnect with one or more input devices, such as a keyboard, mouse, camera, touch screen and a microphone, or with one or more output devices, such as a display screen 1202 and a speaker.

Each communication unit or interface 1204 enables the control station 1200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these. For example, a communication interface 1206 may include an Ethernet connection to the ground station 940, or a wireless communication interface operable to communicate with ground station 940. In some embodiments, the communication interface 1204 may include a RF interface operable to communicate with the UV 110.

Figure 13:
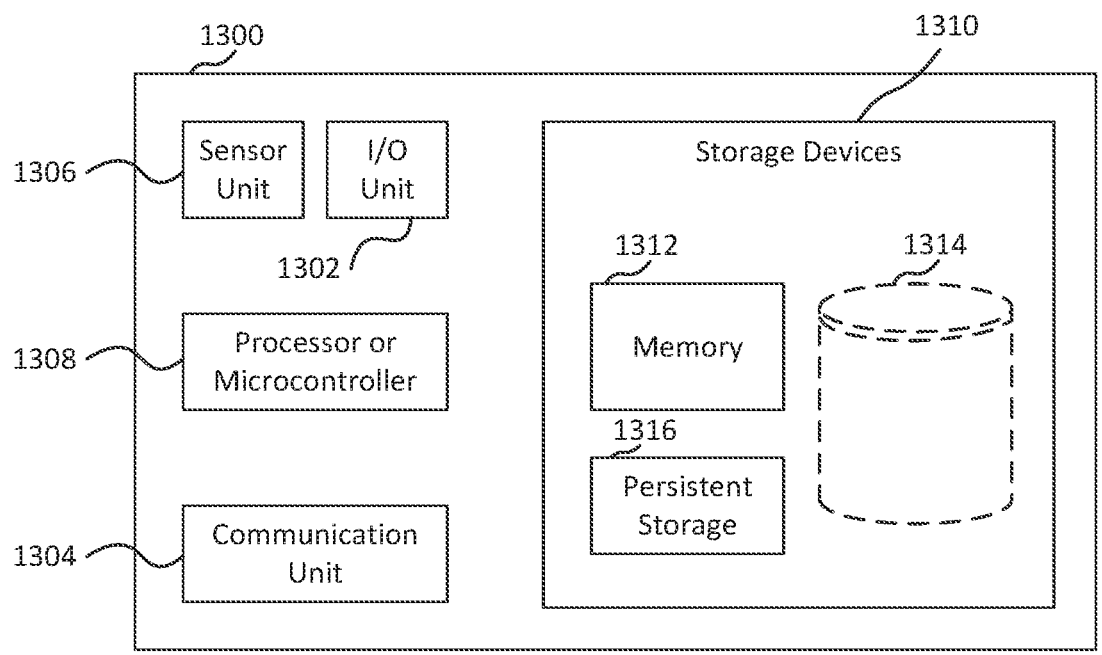
FIG. 13 illustrates, in a component diagram, an example of the logical components of an interposer, in accordance with some embodiments.

FIG. 13 illustrates, in a component diagram, an example of the logical components of an interposer 1300, in accordance with some embodiments. A processor or controller 1308 can execute instructions in memory 1312 to configure the communications module 1304, the payload control module 1210, and the UV control module 1212. A processor 1308 can be, for example, any type of general-purpose microprocessor or microcontroller, a digital signal processing (DSP) processor, an integrated circuit, a field programmable gate array (FPGA), a reconfigurable processor, or any combination thereof.

Memory 1312 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Storage devices 1310 include memory 1312, persistent storage 1116, and optionally, databases 1314.

Each I/O unit 1302 enables the control station 1300 to interconnect with one or more input devices, such as a remote station keypad, touch screen, or with one or more output devices, such as a light source and/or a speaker.

Each communication unit or interface 1304 enables the interposer 1300 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including any combination of these. For example, a communication interface 1306 may include a wireless communication interface operable to communicate with ground station 940. In some embodiments, the communication interface 1304 may include a wired or RF interface operable to communicate with the UV 110 and/or payload 260.

The embodiments of the devices, systems and processes described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references may be made regarding control and computing devices. It should be appreciated that the use of such terms may represent one or more computing devices having at least one processor configured to execute software instructions stored on a computer readable tangible, non-transitory medium.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product instructing physical operations, such as controlling movement of the UV 110, and/or operation of the interposer 250, 750 and/or payload 260, for example. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the processes provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and processes implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The processor or controller 1208, 1308 ground station 940, or interposer 250, 750 may be implemented as a computing device with at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, microelectromechanical systems (MEMS) or micro-size mechanical devices, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the processes described herein.

A processor may be, for example, a general-purpose microprocessor or microcontroller, a digital signal processing (DSP) processor, an integrated circuit, a field programmable gate array (FPGA), a reconfigurable processor, a programmable read-only memory (PROM), or any combination thereof.

Data storage device may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Computing device may include an I/O interface to enable computing device to interconnect with one or more input devices, such as a keyboard, mouse, camera, touch screen and a microphone, or with one or more output devices such as a display screen and a speaker.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, processes and steps described in the specification. As one of ordinary skill in the art will readily appreciate from the disclosure of the present invention, processes, machines, manufacture, compositions of matter, means, processes, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, processes, or steps.

As can be understood, the examples described above and illustrated are intended to be exemplary only. The scope is indicated by the appended claims.

The invention claimed is:
1. An unmanned vehicle (UV) comprising:
an aircraft component;
an interposer component communicatively and mechanically coupled to the aircraft component; and
a payload component communicatively and mechanically coupled to the interposer component;
wherein the interposer component comprises
a processor; and
a memory storing instructions which when executed by the processor configure the processor to:
receive a communication from one of the aircraft component or the payload component; and
send the communication to the other of the aircraft component or the payload component.
2. The UV as claimed in claim 1, wherein the aircraft, interposer and payload components are communicatively coupled by at least one of:
an electrical contact connection;
a tether wire connection; or
a wireless radio connection.
3. The UV as claimed in claim 1, wherein the UV is communicatively coupled to a ground station via an electrical tether wire connection.
4. The UV as claimed in claim 1, wherein:
the aircraft component comprises an aircraft-payload connector;
the interposer component comprises an interposer-aircraft connector; and
wherein the aircraft component is mechanically coupled to the interposer component via a connection between the aircraft-payload connector and the interposer-aircraft connector.
5. The UV as claimed in claim 1, wherein:
the interposer component comprises an interposer-payload connector;
the payload component comprises a payload-aircraft connector; and wherein the interposer component is mechanically coupled to the payload component via a connection between the interposer-payload connector and the payload-aircraft connector.

6. The UV as claimed in claim 1, comprising a plurality of interposer components, wherein:
a first interposer component of the plurality of interposer components is mechanically coupled to the aircraft component;
subsequent interposer components are coupled to previous interposer components via a mechanical connection between the interposer-payload connector of a previous interposer component and the interposer-aircraft connector of a subsequent interposer component; and
a last interposer component of the plurality of interposer components is mechanically coupled to the payload component.

7. The UV as claimed in claim 1, comprising a plurality of interposer components, wherein:
a first interposer component of the plurality of interposer components is mechanically coupled to the aircraft component;
subsequent interposer components are coupled to previous interposer components via a mechanical connection between a first interposer-interposer connector of a previous interposer component and a second interposer-interposer connector of a subsequent interposer component; and
a last interposer component of the plurality of interposer components is mechanically coupled to the payload component.

8. The UV as claimed in claim 1, wherein the payload component is controlled by the interposer component via one of:
an electrical contact connection between the interposer component and the payload component; or
a wireless transmission connection between the interposer component and the payload component.

9. The UV as claimed in claim 1, wherein the aircraft component is controlled by the interposer component via one of:
an electrical contact connection between the interposer component and the aircraft component;
an electrical tethered wire connection between the interposer component and the aircraft component; or
a wireless transmission connection between the interposer component and the aircraft component.

10. A method of controlling the payload component of the UV as claimed in claim 1, the method comprising:
receiving, at the interposer component from the aircraft component, instructions for controlling the payload component;
sending the instructions from the interposer component to the payload component.

11. The method as claimed in claim 10, comprising receiving the instructions at a subsequent interposer component from a previous interposer component.

12. The method as claimed in claim 10, comprising sending the instructions to a subsequent interposer component from a previous interposer component.

13. A method of processing data from the UV as claimed in claim 1, the method comprising:
receiving data at the interposer component from the payload component;
sending the data from the interposer component to the aircraft component.

14. The method as claimed in claim 13, comprising receiving the data from a previous interposer component at a subsequent interposer component.

15. The method as claimed in claim 13, comprising sending the data to a subsequent interposer component from a previous interposer component.

16. A method of controlling a payload of a UV, the UV comprising an aircraft component, a first interposer component, and the payload, the method comprising:
receiving, at the first interposer component, instructions for controlling the payload from one of:
a remote device communicatively connected to the first interposer component;
the aircraft component coupled to the first interposer component; or
a second interposer component coupled to the first interposer component; and
sending the instructions from the first interposer component to the payload.

17. A method of processing data from a UV, the UV comprising an aircraft component, a first interposer component, and a payload, the method comprising:
receiving the data from at least one of:
the payload coupled to the first interposer component;
a sensor on the first interposer component; or
another interposer component;
sending the data to one of:
a ground device communicatively connected to the first interposer component;
an aircraft component coupled to the first interposer component, so that the aircraft component may subsequently send the data to the ground device communicatively connected to the aircraft component; or
a second interposer component coupled to the first interposer component, so that the second interposer component may subsequently send the data to one of:
a subsequent interposer component coupled to the second interposer component, so that subsequent interposer component may subsequently send the data to one of:
the aircraft component; or
the ground device communicatively connected to the subsequent interposer component; or
an aircraft device coupled to the second interposer component, so that the aircraft device may subsequently send the data to the ground device communicatively connected to the aircraft device.

18. The method as claimed in claim 16, wherein the interposer component comprises:
a processor; and
a memory storing instructions which when executed by the processor configure the processor to:
receive a communication from the aircraft component; and
send the communication to the payload.

19. The method as claimed in claim 16, wherein receiving the instructions comprises receiving the instructions from the remote device.

20. The method as claimed in claim 16, wherein receiving the instructions comprises receiving the instructions from the second interposer component.

* * * * *